US012719597B2

(12) United States Patent
Takei et al.

(10) Patent No.: US 12,719,597 B2
(45) Date of Patent: Aug. 25, 2026

(54) WIRELESS COMMUNICATION ENVIRONMENT EVALUATION METHOD AND SYSTEM

(71) Applicant: Hitachi, Ltd., Tokyo (JP)

(72) Inventors: Ken Takei, Tokyo (JP); Yuichi Igarashi, Tokyo (JP); Masami Ohnishi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 445 days.

(21) Appl. No.: 18/244,471

(22) Filed: Sep. 11, 2023

(65) Prior Publication Data

US 2024/0106553 A1 Mar. 28, 2024

(30) Foreign Application Priority Data

Sep. 28, 2022 (JP) ................................ 2022-155063

(51) Int. Cl.
*H04B 17/391* (2015.01)
*H04W 24/06* (2009.01)
*H04W 64/00* (2009.01)

(52) U.S. Cl.
CPC ........ *H04B 17/3912* (2015.01); *H04W 24/06* (2013.01); *H04W 64/003* (2013.01)

(58) Field of Classification Search
CPC . H04B 17/3912; H04B 17/391; H04W 24/06; H04W 64/003; H04W 16/18; H04W 16/22
See application file for complete search history.

(56) References Cited

U.S. PATENT DOCUMENTS 11,015,947 B2 5/2021 Hatanaka
2019/0005166 A1* 1/2019 Yamauchi ............... G06F 30/20
2019/0132041 A1* 5/2019 Takei ....................... H04B 7/10
2020/0412463 A1* 12/2020 Hamabe ............... H04B 17/318
2022/0007216 A1* 1/2022 Asada ................ H04B 17/3912
2023/0059198 A1* 2/2023 Moriuchi .............. H04W 16/28

FOREIGN PATENT DOCUMENTS

JP 2018-200526 A 12/2018
JP 2021-103108 A 7/2021

* cited by examiner

*Primary Examiner* — Chae S Lee
(74) *Attorney, Agent, or Firm* — Crowell & Moring LLP

(57) ABSTRACT

Provided is a wireless communication environment evaluation method including using an information processing device that includes a central processing unit, an output device, an input device, and a memory device, and that is configured to provide a computational resource, in which the information processing device is configured to construct a structural model of an electromagnetic wave scatterer in the computational resource, calculate a characteristic of an electromagnetic field by using the structural model and a ray that simulates a radio wave traveling in a real space, and obtain, on the basis of a result of the calculation using a first structural model corresponding to a real space including a first object and excluding a second object and electromagnetic wave vector measurement data on a real space including the first object and the second object, position information on a position of the second object.

10 Claims, 18 Drawing Sheets

WIRELESS COMMUNICATION ENVIRONMENT EVALUATION METHOD AND SYSTEM

BACKGROUND OF THE INVENTION

1. Field of the Invention

The present invention relates to a technology for evaluating wireless communication characteristics. In particular, the present invention relates to a wireless communication characteristic evaluation technology for wireless communication in which information is transmitted with use of electromagnetic waves in a radio wave environment in which movable radio wave scatterers are present in a service area, and for predicting the wireless communication status in the area through measurement of the electromagnetic field in the service area and numerical analysis of the electric field environment, the numerical analysis using a computational resource.

2. Description of the Related Art

With the global proliferation of mobile wireless information terminals, there is an increasing demand to stably enjoy wireless communication services such as wireless voice calls and wireless data transfer regardless of the surrounding environment. When radio wave scatterers are present in an area providing wireless communication services, the electromagnetic waves of wireless communication media are scattered by the scatterers in question, resulting in power fluctuations when the electromagnetic waves radiated from transmitters reach receivers. In many cases, a decrease in received power occurs, and regions in which high-quality wireless communication is difficult are formed in the area. Further, when the relative positions and orientations of the scatterers in question and transceivers configured to perform communication dynamically change, the area in which high-quality wireless communication is possible may change, and the strengths of signals to be obtained by the receivers may fluctuate over time, resulting in the occurrence of a deterioration in communication quality or times of communication failure.

The occurrence of such regions and times is determined by the relation between the placement of the electromagnetic wave scatterers in the service area and the positions of the transmitters/receivers configured to perform wireless communication. Thus, when a wireless communication network is formed in the area in question, the relation between the placement of transmitters/receivers and the positions of electromagnetic wave scatterers in the area significantly affect the communication status in the wireless communication network.

To solve such problems, there has been proposed a technology that constructs, in a computer, an electromagnetic field model for analyzing the wireless communication characteristics in the service area and virtually implements the electromagnetic field distribution regarding the placement state of all transmitters/receivers in the area in question. In order to construct an electromagnetic field computational model in a computational resource, it is necessary to construct, in the computational resource, a structural model of electromagnetic wave scatterers that affect electromagnetic waves present in the wireless communication service area. Data on structures in the service area can theoretically be obtained from design data on buildings, catalog specifications of furniture present in the area, or the like. However, when the structures are movable, it is necessary to modify the constructed structural model in the computer according to the actual situation.

Some such modification technologies have been proposed. For example, Japanese Patent Laid-open No. 2018-200526 describes a technology in which a movable body confirms markers attached to fixed structures and reports its own position by itself. Further, Japanese Patent Laid-open No. 2021-103108 describes a technology in which a movable body receives signals transmitted from satellites present outside the communication area, to recognize and report its own position.

SUMMARY OF THE INVENTION

The related-art technologies both rely on the movable body recognizing and reporting its own position. However, when the movable body does not include means for reporting or when communication means for reporting is unusable due to malfunctions or the like, it is impossible to identify the position of the movable body, which is a problem.

It is an object of the present invention to estimate the position of a movable body without requiring the movable body to recognize and report its own position, and to reflect the position in a structural model constructed in a computer for the purpose of wireless communication environment evaluation.

According to an aspect of the present invention, there is provided a wireless communication environment evaluation method including using an information processing device that includes a central processing unit, an output device, an input device, and a memory device and that is configured to provide a computational resource, in which the information processing device is configured to construct a structural model of an electromagnetic wave scatterer in the computational resource, calculate a characteristic of an electromagnetic field by using the structural model and a ray that simulates a radio wave traveling in a real space, and obtain, on the basis of a result of the calculation using a first structural model corresponding to a real space including a first object and excluding a second object and electromagnetic wave vector measurement data on a real space including the first object and the second object, position information on a position of the second object.

According to another aspect of the present invention, there is provided a wireless communication environment evaluation system including an incoming wave information memory module configured to store measurement data on an arrival direction of a received wave in a wireless communication service area, an electromagnetic field analysis model storage module configured to store a structural model of an electromagnetic wave scatterer, and an electromagnetic field computational engine configured to perform an electromagnetic field calculation, in which the electromagnetic field computational engine estimates, by using the measurement data and the structural model, a position of a movable body in the wireless communication service area through the electromagnetic field calculation.

According to the present invention, it is possible to estimate the position of the movable body without requiring the movable body to recognize and report its own position, and to reflect the position in the structural model constructed in the computer for the purpose of wireless communication environment evaluation.

DESCRIPTION OF THE PREFERRED EMBODIMENTS

Figure 1A:
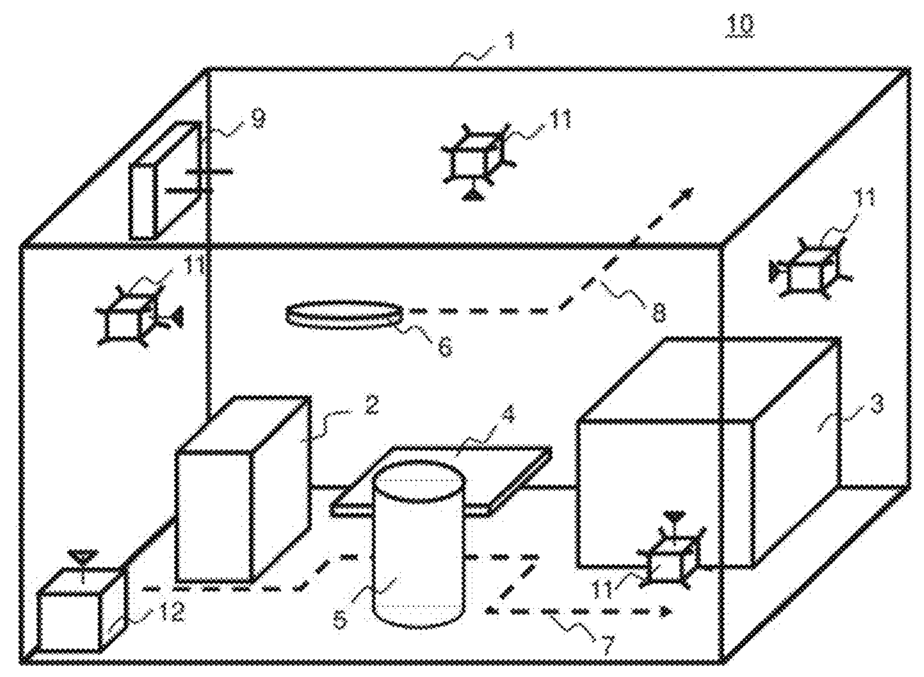
FIG. 1A is a configuration diagram of an exemplary wireless communication environment evaluation system in a real space.

Now, embodiments are described with reference to the drawings. However, the present invention is not interpreted as being limited to the contents of the embodiments described below. Those skilled in the art can easily understand that the specific configurations may be changed without departing from the spirit or gist of the present invention.

In the configurations of the embodiments described below, the same parts or parts having similar functions are denoted by the same reference numerals in different figures, and redundant descriptions may be omitted.

In a case where there are a plurality of elements having the same or similar functions, the elements may be denoted by the same reference numerals with different suffixes. However, in a case where there is no need to distinguish between the plurality of elements, the suffixes may be omitted.

The terms such as "first," "second," and "third" in this specification and the like are given to identify the components and do not necessarily limit the number, order, or contents thereof. Further, the numbers for identifying the components are used for each context, and the number used in one context does not necessarily indicate the same configuration in other contexts. Further, a component identified by a certain number is not prevented from functioning also as a component identified by another number.

The position, size, shape, range, and the like of each configuration illustrated in the figures and the like may not represent the actual position, size, shape, range, or the like thereof in order to facilitate understanding of the invention. Thus, the present invention is not necessarily limited to the positions, sizes, shapes, ranges, and the like illustrated in the figures and the like.

Publications, patents, and patent applications cited herein form part of the description of this specification as they are.

Unless specifically indicated otherwise in the context, components represented in singular forms herein are assumed to include their plural forms.

An exemplary embodiment is given. Measurement transceivers configured to receive, at a plurality of antennas, electromagnetic waves used for communication and measure arrival directions thereof are deployed at a plurality of points in a wireless communication service area, and the arrival directions of the received waves of communication transceivers placed in the service area are measured. A computational model for electromagnetic field analysis is formed in a computational resource with use of shape data on fixed structures, and the positions of micro regions on the surfaces of movable bodies present in the service area are identified through numerical calculations for electromagnetic fields with use of electromagnetic wave propagation trajectories calculated from the computational model in question and the arrival directions of the electromagnetic waves obtained from the plurality of measurement transceivers in the service area. A large number of arrival directions measured by the plurality of measurement transceivers and a large number of micro regions obtained from a large number of propagation trajectories calculated with use of the computational model for electromagnetic field analysis are grouped in the computational resource, thereby identifying the shape of the movable body.

Here, the computational resource refers to a function provided by an information processing device including, for example, a processing unit, a memory device, an input device, and an output device. Typically, the computational resource can be implemented by the processing unit processing and utilizing software and data in the memory device.

Embodiment 1

An exemplary wireless communication environment evaluation system configured to accurately predict communication performance in wireless communication environments including movable bodies is described with reference to FIG. 1A to FIG. 1D.

In Embodiment 1, electromagnetic waves having propagation characteristics similar to those of electromagnetic waves used for communication are transmitted in a plurality of directions from a plurality of points in a wireless communication service area in a real space. Measurement transceivers configured to receive the electromagnetic waves in question at a plurality of antennas and measure the arrival directions thereof are deployed. A computational model for electromagnetic field analysis is constructed in a virtual space in a computational resource with use of shape data on fixed structures, and the positions of movable bodies present in the service area are estimated through numerical calculations for electromagnetic fields with use of electromagnetic wave propagation trajectories calculated from the computational model in question and the arrival directions of the electromagnetic waves obtained from the plurality of measurement transceivers in the service area.

Figure 1B:
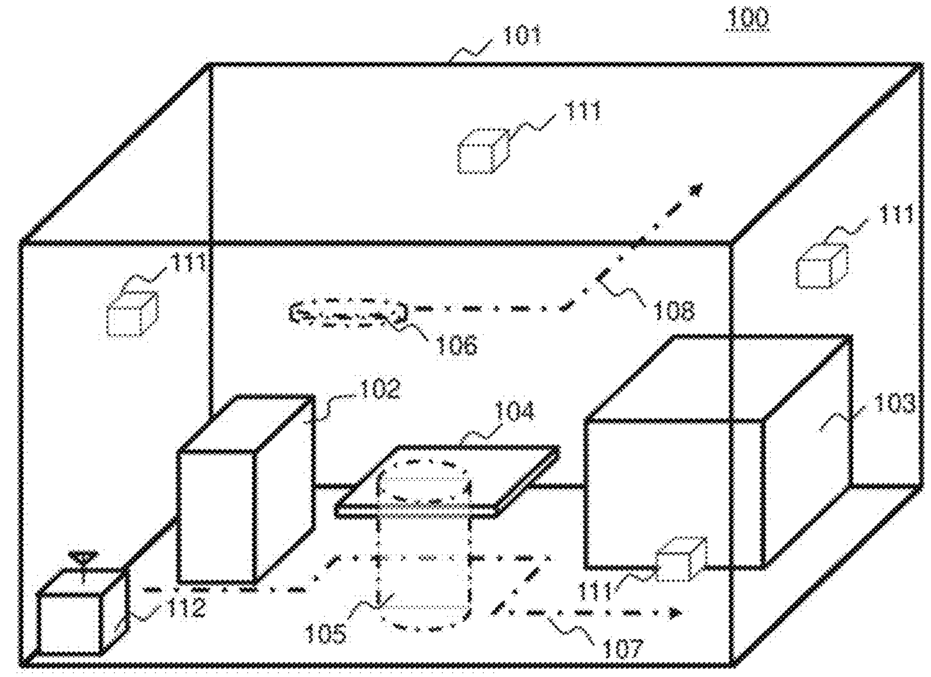
FIG. 1B is a configuration diagram of the exemplary wireless communication environment evaluation system in a virtual space.

FIG. 1A illustrates the hardware placement in a real space 10. FIG. 1B illustrates a computational model for electromagnetic field analysis of the real space 10 of FIG. 1A, the computational model being constructed in a virtual space in a computational resource 100.

As illustrated in FIG. 1A, a room 1 including a ceiling, walls, and a floor is present in the real space 10, and a shelf 2, a container 3, and a table 4 are placed inside the room 1 in question. On the ceiling, walls, and floor of the room 1, a plurality of measurement transceivers 11 are deployed, and a central wireless station 12 is deployed on the floor. Inside the room 1, a floating movable body 6 (for example, a drone) configured to change its position in mid-air and a grounded movable body 5 (for example, a robot) configured to change its position on the floor are present. The floating movable body 6 changes its position on an air route 8, and the grounded movable body 5 changes its position on a path 7. Note that the placement position of each element is an example, and the present invention is not limited to this.

In such a real space 10, there may be a need to perform wireless communication between the grounded movable body 5 or the floating movable body 6 and an access point 9 to control the robot or the drone, or to receive data collected by the robot or the drone. However, since the grounded movable body 5 and the floating movable body 6 change their positions over time, the wireless environment changes over time, and the communication performance accordingly changes.

As illustrated in FIG. 1B, on the basis of the real space, in the computational resource 100, a virtual room 101 is present, and a virtual shelf 102, a virtual table 104, and a virtual container 103 are placed inside the virtual room 101 in question. On the ceiling, walls, and floor of the virtual room 101, a plurality of virtual measurement transceivers 111 are deployed, and a virtual central wireless station 112 is deployed on the floor. Inside the virtual room 101, a virtual floating movable body 106 configured to change its position in mid-air and a virtual grounded movable body 105 configured to change its position on the floor are predicted. The virtual floating movable body 106 is presumed to change its position on a virtual air route 108, and the virtual grounded movable body 105 is presumed to change its position on a virtual path 107.

Figure 1C:
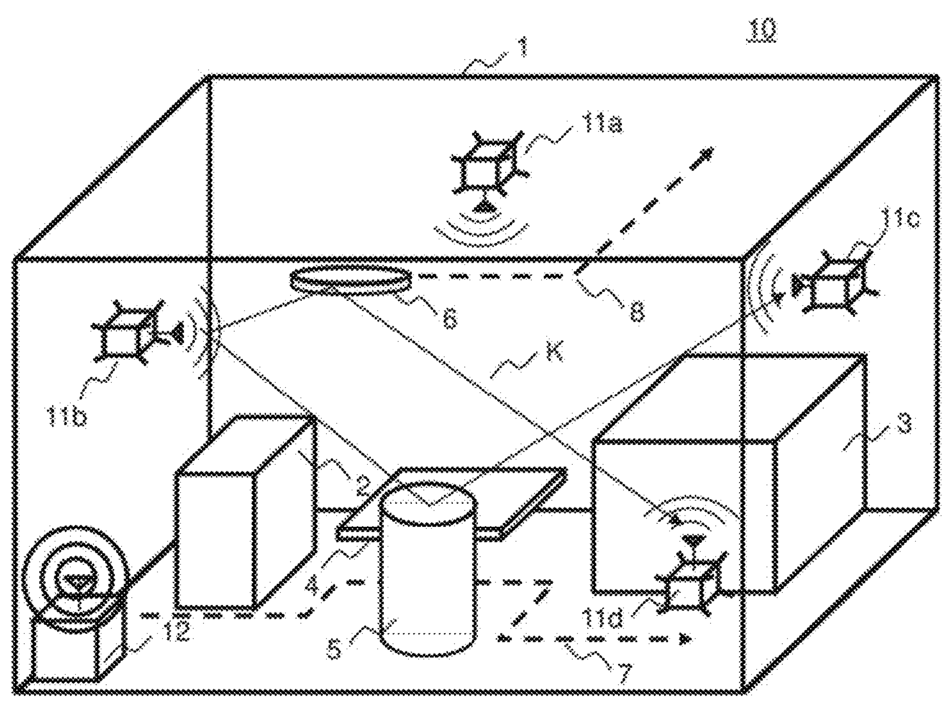
FIG. 1C is a configuration diagram of the exemplary wireless communication environment evaluation system in the real space.
Figure 1D:
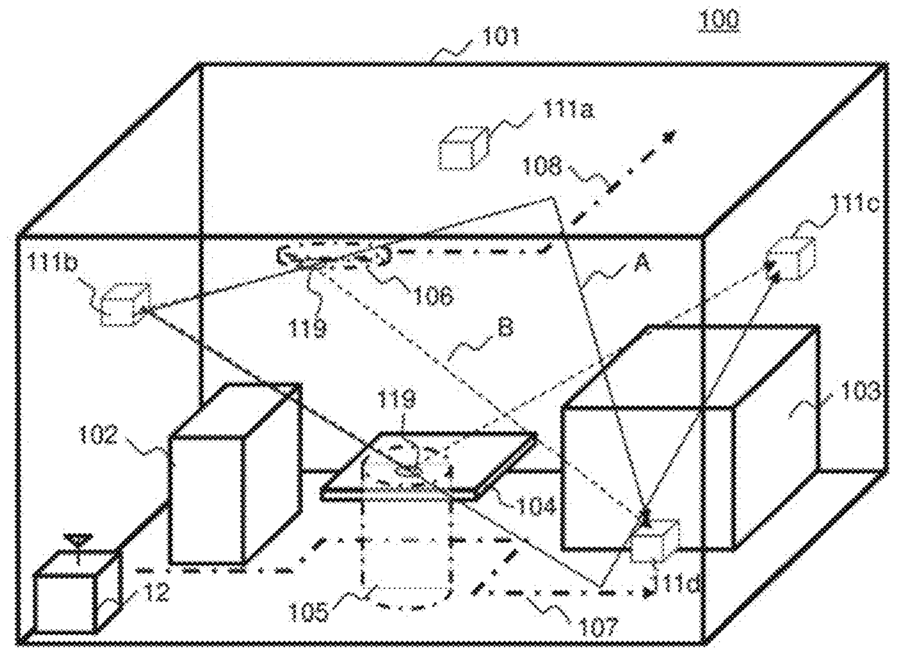
FIG. 1D is a configuration diagram of the exemplary wireless communication environment evaluation system in the virtual space.

FIG. 1C and FIG. 1D are diagrams illustrating an operation of the wireless communication environment evaluation system configured to accurately predict communication performance in wireless communication environments including movable bodies. FIG. 1C illustrates the real space 10, and FIG. 1D illustrates the state in the computational resource 100.

As illustrated in FIG. 1C, electromagnetic waves transmitted in a distributed manner from a measurement transceiver 11*b*, which is placed on the left wall in the real space 10, travel straight in a plurality of directions as wave packets. As represented by solid arrows, the wave packet that has collided with the floating movable body 6 is reflected by the floating movable body 6 in question, thereby arriving at a measurement transceiver 11*d* as a received wave. The wave packet that has collided with the grounded movable body 5 is reflected by the grounded movable body 5 in question, thereby arriving at a measurement transceiver 11*c* as a received wave. Each of the measurement transceivers 11 reports the reception status of the incoming wave (for example, the reception strength and the arrival direction) to the central wireless station 12 with wireless means (or wired means). The measurement transceiver 11 includes antennas with directivity in six orthogonal directions, for example, and can measure the arrival directions and strengths of received radio waves on the basis of received signal of each antenna.

As illustrated in FIG. 1D, the central wireless station 12 constructs a computational model for electromagnetic field analysis with the computational resource 100 without the floating movable body 6 and the grounded movable body 5, by using structural data on the virtual room 101, the virtual shelf 102, the virtual table 104, and the virtual container 103. The central wireless station 12 obtains, through calculations, rays (represented by solid arrows A) corresponding to the incoming waves in the real space through electromagnetic field analysis using a ray tracing method.

There have been known techniques for creating a computational model for electromagnetic field analysis. For example, structural data can be obtained from design data on buildings or catalog specifications of furniture present in the area. Alternatively, a point cloud measurement system using a measurement system using light waves such as visible light and infrared light, which is called Light Detection and Ranging (LIDAR), is used to obtain a set of three-dimensional coordinates (point cloud) of points at which reflection has occurred, thereby obtaining structural data.

The structural model for electromagnetic field calculations, which is represented by the polygons created with use of the point cloud data, is modified with use of measurable physical quantities (for example, reflectivity and an absorption rate of radio waves) in the service area, thereby reproducing the wireless communication environment in the real space (referred to as an "environment reproduction model"). Since the strengths and directions of the radio waves emitted from the measurement transceivers 11 in the real space are known, a wireless communication environment is reproduced through ray tracing calculations, and the strength and arrival direction of a radio wave at any point can be estimated (for reference on these technologies, see, for example, WO2012/172670 A1).

The central wireless station 12 compares incoming wave information obtained from the measurement transceivers 11 with the calculation results of the rays in the computational resource, thereby identifying positions in the virtual room 101 at which the transmitted waves from the measurement transceiver 11*b* have been reflected, through ray tracing calculations. That is, the incoming wave information when the floating movable body 6 and the grounded movable body 5 are present, which has been obtained from the measurement transceivers 11 (first information), is compared with the incoming wave information when neither the floating movable body 6 nor the grounded movable body 5 are present, which has been obtained through calculations of the rays in the computational resource (second information), and the environment reproduction model is modified to make the second information on the virtual space closer to the first information on the real space.

Here, the incoming wave information refers, for example, to the arrival directions and strengths of radio waves at a plurality of measurement points distributed in a space and indicates the arrival directions and strengths of radio waves that can be measured or estimated by the measurement transceivers 11 and the virtual measurement transceivers 111 in the present embodiment. In the example of FIG. 1D, a micro region 119 is added to the environment reproduction model to change the ray estimated by a virtual measurement transceiver 111*c* and a virtual measurement transceiver 111*d*, which is represented by the solid arrow A, to the ray measured in the real space, which is represented by a dotted arrow B. The micro region 119 is, for example, a point or a surface with a finite area.

As the simplest method of searching for the micro region 119 described above, it is sufficient to set micro regions at various positions to cover the virtual space in the computational resource 100, repeat ray tracing calculations, and obtain, as a result, the micro region 119 with which the second information is closest to the first information. Alternatively, when the movement course of the floating movable body 6 or the grounded movable body 5 is determined in advance, a micro region may be set in a limited region around the course.

According to the present embodiment, it is possible to identify the positions at which the movable bodies in the wireless communication service area have scattered electromagnetic waves used for wireless communication. Thus, it becomes possible to predict the positions of the movable bodies in the service area in question and predict how the communication environment in the service area changes by the presence of the movable bodies in question and how the communication quality changes as a result. Thus, it becomes possible to dynamically recognize the communication performance of the wireless communication system, and there is an effect on controlling the wireless communication system to stably operate.

Embodiment 2

A wireless communication environment evaluation system configured to accurately predict communication performance in wireless communication environments including movable bodies of another embodiment is described with reference to FIG. 2A and FIG. 2B.

In Embodiment 2 based on Embodiment 1, the positions of micro regions on the surfaces of the movable bodies present in a service area are identified through numerical calculations for electromagnetic fields. With use of the arrival directions of a plurality of radio waves measured by the plurality of measurement transceivers and the computational model for electromagnetic field analysis constructed in the computational resource, a plurality of micro regions obtained from a plurality of calculated propagation trajectories are grouped to estimate the shapes of the movable bodies.

Figure 2A:
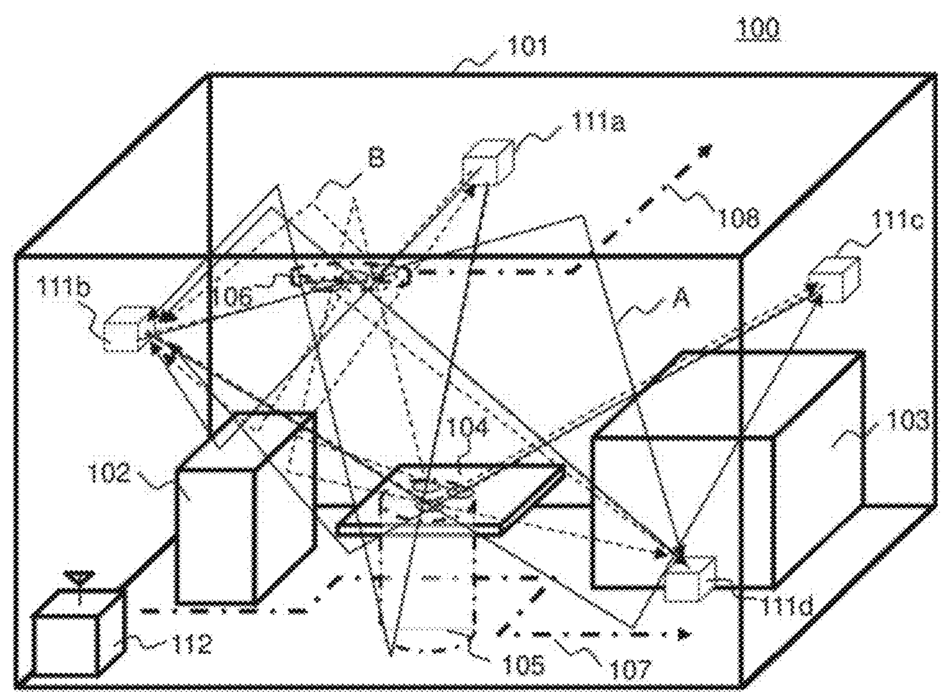
FIG. 2A is a configuration diagram of another exemplary wireless communication environment evaluation system in the virtual space.

FIG. 2A is a diagram illustrating a method of identifying, with use of incoming wave directions measured by the measurement transceivers 11 in the real space 10, a plurality of micro region positions at which the floating movable body 6 and the grounded movable body 5 reflect transmitted waves from the measurement transceivers 11, in the computational resource 100.

Figure 2B:
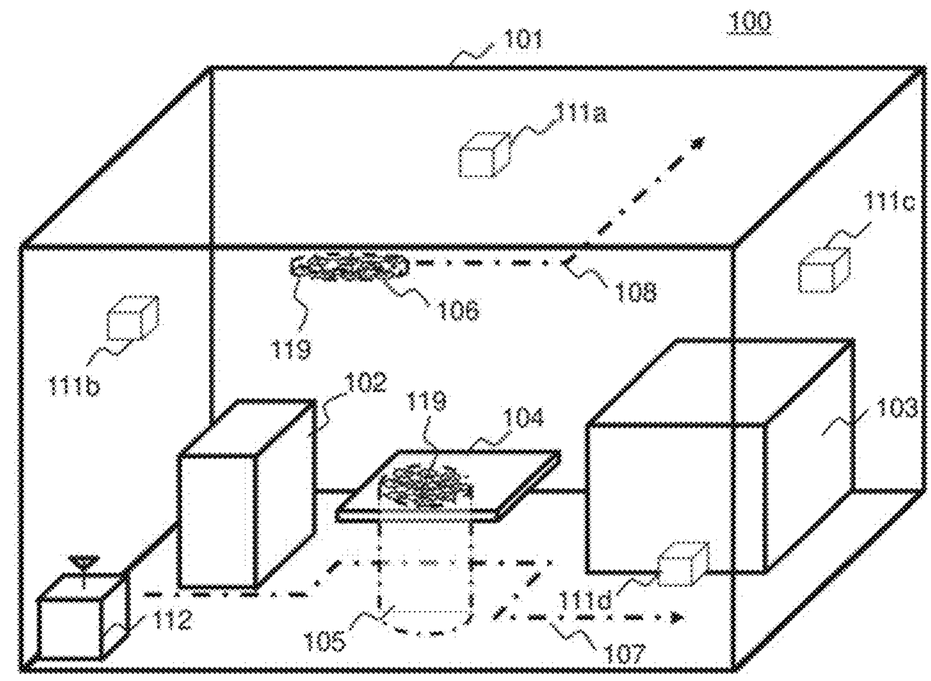
FIG. 2B is a configuration diagram of the other exemplary wireless communication environment evaluation system in the virtual space.

FIG. 2B is a diagram illustrating a method of estimating the shapes of the floating movable body 6 and the grounded movable body 5 from a plurality of micro regions 119 on the floating movable body 6 and the grounded movable body 5.

In the real space corresponding to the computational resource 100 of FIG. 2A, as in Embodiment 1 (FIG. 1C), the transmitted waves from the measurement transceiver 11*b* are reflected by the floating movable body 6 and the grounded movable body 5 to arrive at the respective measurement transceivers, namely, the measurement transceiver 11*d* and the measurement transceiver 11*c*. The transmitted wave from a measurement transceiver 11*a* is reflected by the grounded movable body 5 to arrive at the measurement transceiver 11*d*. The transmitted wave from the measurement transceiver 11*c* is reflected by the grounded movable body 5 to arrive at the measurement transceiver 11*a*. The transmitted wave from the measurement transceiver 11*a* is reflected by the floating movable body 6 to arrive at the measurement transceiver 11*b*. The transmitted wave from the measurement transceiver 11*d* is reflected by the floating movable body 6 to arrive at the measurement transceiver 11*b* (see the rays represented by the dotted arrows B).

As in Embodiment 1, the micro region 119 is added to the environment reproduction model to change the ray estimated by the virtual measurement transceiver 111*c* and the virtual measurement transceiver 111*d*, which is represented by the solid arrow A, to the ray measured in the real space, which is represented by the dotted arrow B.

FIG. 2A illustrates exemplary reflection from the floating movable body 6 and the grounded movable body 5 for specific wave packets of the transmitted waves from the measurement transceivers 11. Similar procedures are performed on reflection from the floating movable body 6 and the grounded movable body 5 for a plurality of (ideally, all) wave packets of the transmitted waves from the measurement transceivers 11, thereby obtaining the plurality of micro regions 119 contributing to the reflection of the plurality of wave packets of the transmitted waves from the measurement transceivers 11, as illustrated in FIG. 2B.

In the computational resource, the plurality of micro regions 119 obtained in this way can be divided into groups that are close to each other on the basis of their relative positions. For this purpose, it is sufficient to set a threshold for the distance between the micro regions 119. Moreover, by generating polygons having, as their vertices, the centers of the plurality of grouped micro regions 119 and connecting adjacent polygons, virtual objects corresponding to the floating movable body 6 and the grounded movable body 5 can be generated in the computational resource.

That is, by setting a large number of the micro regions 119 compared to Embodiment 1 and connecting the micro regions 119 to each other modify the environment reproduction model (specifically, to add polygons and physical quantities associated therewith), an environment reproduction model including the virtual floating movable body 106 and the virtual grounded movable body 105 can be obtained.

In the example of FIG. 2A and FIG. 2B, the plurality of micro regions 119 of FIG. 2B are identified to change the rays represented by the solid arrows A of FIG. 2A to the rays represented by the dotted arrows B, and the plurality of micro regions 119 are coupled to each other, thereby adding the virtual floating movable body 106 and the virtual grounded movable body 105 (outer shapes thereof). The more rays are calculated, the more accurate the estimation of the outer shapes.

According to the present embodiment, it is possible to reproduce, in the computational resource, the movable bodies in the wireless communication service area. Thus, it becomes possible to predict how the communication environment in the service area changes and how the communication quality changes as a result. Thus, it becomes possible to dynamically recognize the communication performance of the wireless communication system, and there is an effect on controlling the wireless communication system to stably operate.

Embodiment 3

A wireless communication environment evaluation system configured to accurately predict communication performance in wireless communication environments including movable bodies of another embodiment is described with reference to FIG. 3A and FIG. 3B.

In Embodiment 3, in addition to Embodiment 2, a movement trajectory of the movable body is estimated from the information on the estimated shape and position of the movable body that change over time. In Embodiment 3, by configuring, in the virtual space, snapshots of the communication environment of the movable body which moves over time and coupling the snapshots to each other, the trajectory of the movable body can be reproduced.

Figure 3A:
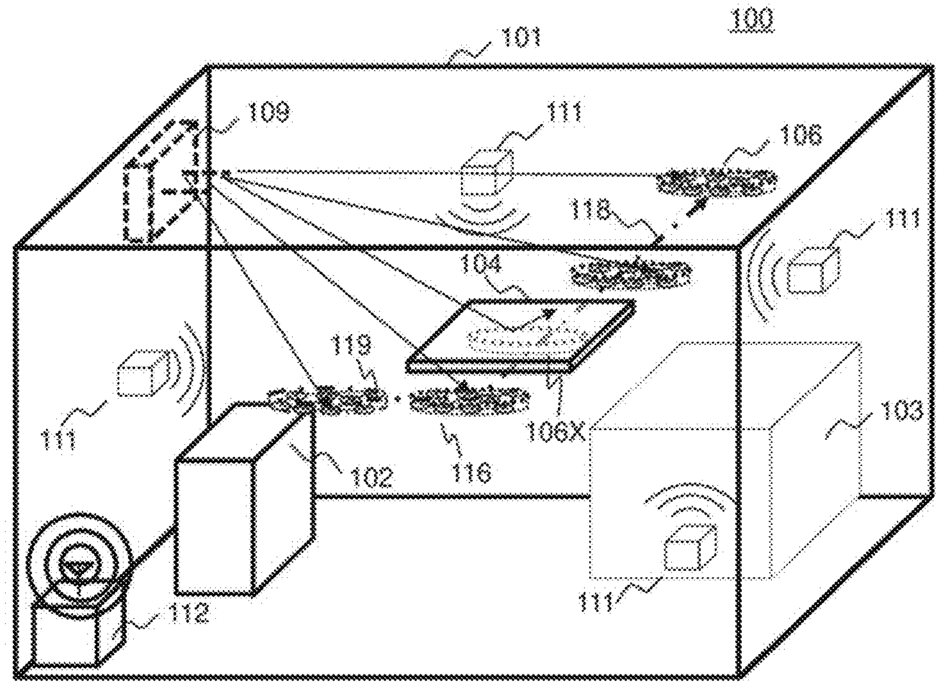
FIG. 3A is a configuration diagram of another exemplary wireless communication environment evaluation system in the virtual space.

In FIG. 3A, with use of incoming wave directions measured by the measurement transceivers 11 in the real space 10, the positions of the one or a plurality of micro regions 119 at which the floating movable body 6 reflects transmitted waves from the measurement transceivers 11 are identified in the computational resource 100. The shape of the floating movable body 6 is estimated in a time series manner from the plurality of identified micro regions 119, thereby estimating a virtual air route 118 on which the floating movable body 6 changes its presence position. When the number of the micro regions 119 is one, the shape of the movable body cannot be estimated, but an approximate air route can be estimated.

As in Embodiment 2, the process of generating, with use of the directions in which the waves transmitted from the plurality of measurement transceivers 11 to be reflected by the floating movable body 6 arrive at the other measurement transceivers 11 as received waves, the virtual floating movable body 106 corresponding to the floating movable body 6 in the computational resource. This process is repeated in a time series manner to form a virtual floating movable body group 116 in the computational resource. The virtual floating movable body group 116 illustrated in FIG. 3A includes the plurality of virtual floating movable bodies 106 corresponding to the floating movable body 6 at different times.

The floating movable body 6 may be, for example, a remotely operated drone, and the operation thereof may be controlled by radio waves from the access point 9. When there is a need to stably transmit radio waves to the floating movable body 6 which changes its position over time, from the access point 9 placed in the real space, a virtual access point 109 corresponding to the access point 9 which is placed in the real space is set in the computational resource. From the virtual access point 109, transmitted waves can be generated toward the virtual floating movable body group 116 as a plurality of wave packets, and the course for the wave packets in question to reach the virtual floating movable body group 116 can be calculated.

Figure 3B:
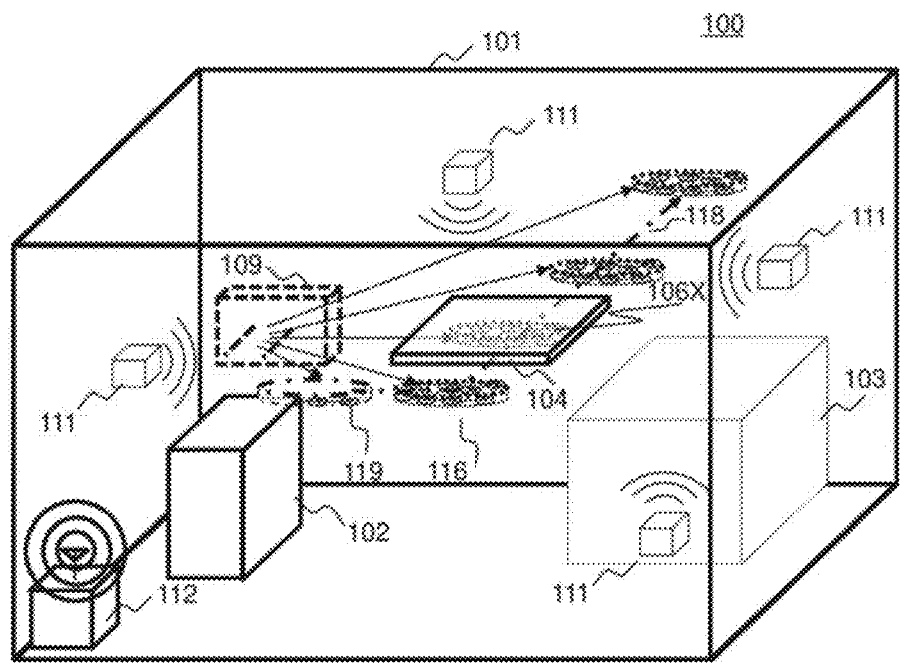
FIG. 3B is a configuration diagram of the other exemplary wireless communication environment evaluation system in the virtual space.

FIG. 3B is a diagram illustrating a method of changing, after the virtual floating movable body group 116 has been formed by following the procedure of FIG. 3A, the placement position of the virtual access point 109 in the virtual room 101, thereby determining a configuration in which the transmitted waves from the virtual access point 109 in question reach all the virtual floating movable bodies 106 forming the virtual floating movable body group 116.

In this example, it is found through ray tracing calculations that, in the computational resource 100 of FIG. 3A, a virtual floating movable body 106X is obstructed, by the virtual table 104, from receiving the radio wave from the virtual access point 109. Thus, as illustrated in FIG. 3B, by performing ray tracing calculations with various positions of the virtual access point 109, a position that allows the radio waves from the virtual access point 109 to reach the whole virtual floating movable body group 116 including the virtual floating movable body 106X can be searched for. When the air route 8 is a determined route, the radio waves from the access point 9 located in the real space correspondingly to the virtual access point 109 can always stably reach the virtual floating movable body 106.

According to the present embodiment, it is possible to predict the optimal position of the access point 9, which allows communication with the movable body in the wireless communication service area. Thus, there is an effect of implementing highly reliable and stable wireless communication with the movable body present in the wireless communication service area.

Embodiment 4

A wireless communication environment evaluation system configured to accurately predict communication performance in wireless communication environments including movable bodies of another embodiment is described with reference to FIG. 4A and FIG. 4B. In Embodiment 3, the position of the access point 9 is changed to ensure communication with the movable body. In Embodiment 4, instead of changing the position of the access point, the course of the movable body is changed.

Figure 4A:
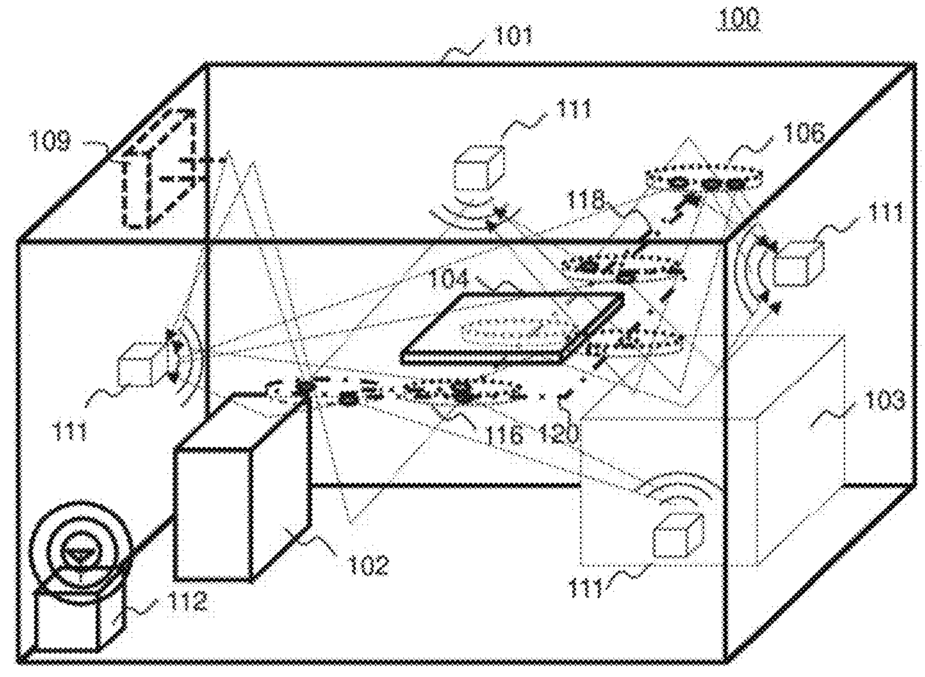
FIG. 4A is a configuration diagram of another exemplary wireless communication environment evaluation system in the virtual space.

FIG. 4A is a diagram illustrating a method including the following: identifying, in the computational resource, one or a plurality of micro region positions at which the floating movable body 6 reflects transmitted waves from the measurement transceivers 11, with use of incoming wave directions measured by the measurement transceivers 11 in the real space 10, estimating, from the result of estimating the shape of the floating movable body 6 in a time series manner from the plurality of micro regions 119 in question, an air route on which the floating movable body 6 changes its presence position, extracting, through ray tracing calculations, positions which is present in the air route in question and where the radio waves are difficult to reach, and generating a new air route that avoids such difficult-to-reach positions.

As in Embodiment 3, the process of generating, with use of the directions in which the waves transmitted from the plurality of measurement transceivers 11 to be reflected by the floating movable body 6 arrive at the other measurement transceivers 11 as received waves, the virtual floating movable bodies 106 corresponding to the floating movable body 6 at different times in the computational resource is repeated in a time series manner. From the set of the virtual floating movable bodies 106, the virtual floating movable body group 116 is formed in the computational resource. The trajectories of the virtual floating movable bodies 106 forming the obtained virtual floating movable body group 116 are generated, and a portion of the trajectories in question where none of the transmitted waves from the plurality of virtual access points 109 corresponding to the plurality of access points 9 in the real space can reach are determined through ray tracing calculations. Then, the above-described portion in the trajectories in question is replaced by a position where any of the transmitted waves from the virtual access points 109 can reach, thereby generating a new air route on which the virtual floating movable body 106 may be present.

In FIG. 4A, it is found through ray tracing calculations that, on the virtual air route 118, one of the virtual floating movable bodies 106 has a difficulty in receiving the transmitted wave from the virtual access point 109, due to the virtual table 104. Thus, the virtual air route 118 is changed to a virtual detour air route 120. To determine the alternative virtual air route, it is sufficient to assume a plurality of routes that allow movement without obstruction from fixed objects such as the virtual shelf 102, the virtual table 104, and the virtual container 103, and to simulate the radio wave conditions.

Figure 4B:
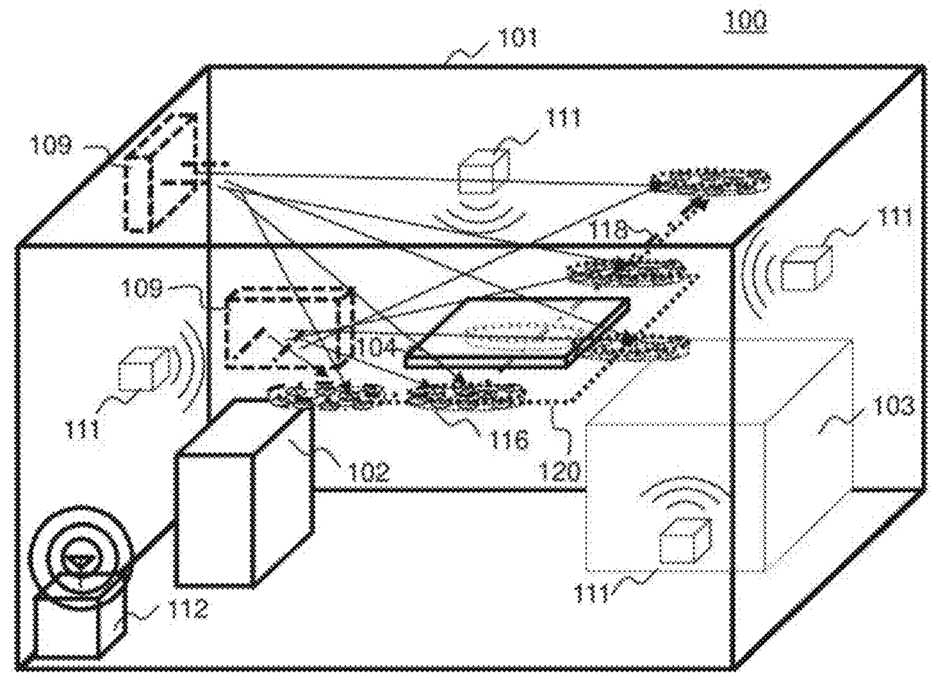
FIG. 4B is a configuration diagram of the other exemplary wireless communication environment evaluation system in the virtual space.

FIG. 4B is a diagram illustrating a method of verifying, through ray tracing calculations, whether, when the virtual floating movable body 106 is present on the air route newly generated by changing the virtual air route 118 to the virtual detour air route 120 by following the procedure of FIG. 4A, at least one (or all) of the virtual access points 109 installed in the virtual room 101 can wirelessly communicate with all the virtual floating movable bodies 106 of the virtual floating movable body group 116.

According to the present embodiment, the movement trajectory of the movable body is estimated, and difficult-to-communicate areas in the estimated movement trajectory are identified. Then, by searching for an air route that avoids the difficult-to-communicate areas, an air route which allows the access point 9 installed in the wireless communication service area to wirelessly communicate with the movable body stably and on which the movable body in question is to be present can be discovered. Thus, it is possible to implement highly reliable and stable wireless communication with the movable body present in the wireless communication service area.

Embodiment 5

A wireless communication environment evaluation system configured to accurately predict communication performance in wireless communication environments including movable bodies of another embodiment is described with reference to FIG. 5A and FIG. 5B. In the present embodiment, radio waves from the access point 9 that is installed in the real space and used for communicating with the grounded movable body 5 or the floating movable body 6, are utilized in movable body position detection.

Figure 5A:
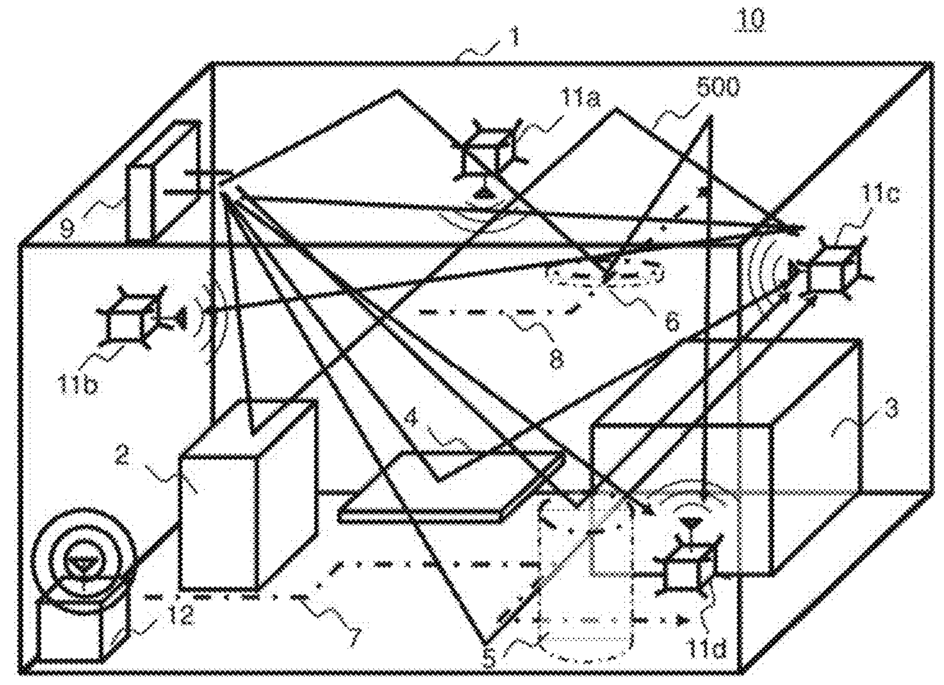
FIG. 5A is a configuration diagram of another exemplary wireless communication environment evaluation system in the real space.
Figure 5B:
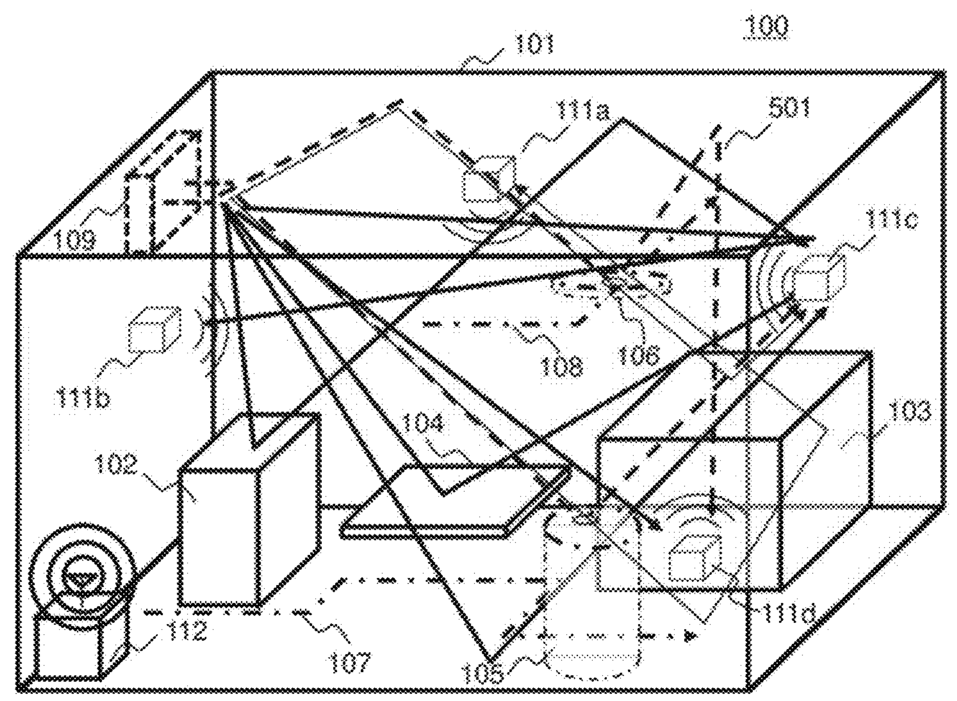
FIG. 5B is a configuration diagram of the other exemplary wireless communication environment evaluation system in the virtual space.

FIG. 5A illustrates an operation of hardware placed in the real space 10, and FIG. 5B is a diagram illustrating a method of identifying micro regions on the movable bodies in which electromagnetic waves are scattered, through electromagnetic field analysis in the computational resource 100.

In FIG. 5A, in the real space 10, the room 1 including a ceiling, walls, and a floor is present, and the shelf 2, the container 3, and the table 4 are placed inside the room 1 in question. On the ceiling, walls, and floor of the room 1, the plurality of measurement transceivers 11 are deployed, and the central wireless station 12 is deployed on the floor. Inside the room 1, the floating movable body 6 configured to change its position in mid-air and the grounded movable body 5 configured to change its position on the floor are present. The floating movable body 6 changes its position on the air route 8, and the grounded movable body 5 changes its position on the path 7. The access point 9 is placed inside the room 1, and transmitted waves generated by the access point 9 in question are scattered by the floor, ceiling, and walls of the room 1, the shelf 2, the table 4, the container 3, the floating movable body 6, and the grounded movable body 5 to generate reflected waves. The reflected waves in question reach the plurality of measurement transceivers 11 to be measured as received waves and the information thereon is transferred to the central wireless station 12.

In the central wireless station 12, as in the already described embodiments, the virtual grounded movable body 105 or the virtual floating movable body 106 corresponding to the grounded movable body 5 or the floating movable body 6 and, further, the virtual path 107 or the virtual air route 108 are estimated. In the present embodiment, a radio wave 500 from the access point 9 and a ray 501 from the virtual access point 109 are also utilized in estimation calculations.

FIG. 5B is a diagram illustrating an operation in the computational resource 100 of the wireless communication environment evaluation system configured to accurately predict communication performance in wireless communication environments including movable bodies. Electromagnetic waves transmitted in a distributed manner from the virtual access point 109 corresponding to the access point 9 placed on the left wall of FIG. 5A travel straight in a plurality of directions as wave packets. The wave packet that has collided with the virtual floating movable body 106 corresponding to the floating movable body 6 is reflected by the virtual floating movable body 106 in question to arrive at the virtual measurement transceiver 111*d* corresponding to the measurement transceiver 11*d*, thereby serving as a received wave. The wave packet that has collided with the virtual grounded movable body 105 corresponding to the grounded movable body 5 is reflected by the virtual grounded movable body 105 to arrive at the virtual measurement transceiver 111*c* corresponding to the measurement transceiver 11*c*, thereby serving as a received wave.

The central wireless station 12 can construct a computational model for electromagnetic field analysis with the computational resource 100 including the virtual floating movable body 106 and the virtual grounded movable body 105, by using structural data on the virtual room 101, the virtual shelf 102, the virtual table 104, and the virtual container 103. The central wireless station 12 can determine rays corresponding to the incoming waves in the real space 10 through electromagnetic field analysis using a ray tracing method, thereby simulating the radio waves from the access point 9.

According to the present embodiment, it is possible to identify the positions at which the movable bodies in the wireless communication service area have scattered electromagnetic waves used for wireless communication, by also utilizing radio waves from the access point 9. Thus, it becomes possible to predict the position of the movable body in the service area in question and predict how the communication environment in the service area changes by the presence of the movable body in question and how the communication quality changes as a result. Thus, it becomes possible to dynamically recognize the communication performance of the wireless communication system, and there is an effect on controlling the wireless communication system to stably operate.

Embodiment 6

A wireless communication environment evaluation system configured to accurately predict communication performance in wireless communication environments including movable bodies of another embodiment is described with reference to FIG. 6A and FIG. 6B. In Embodiment 6, a technique for reducing a computational load is described.

Figure 6A:
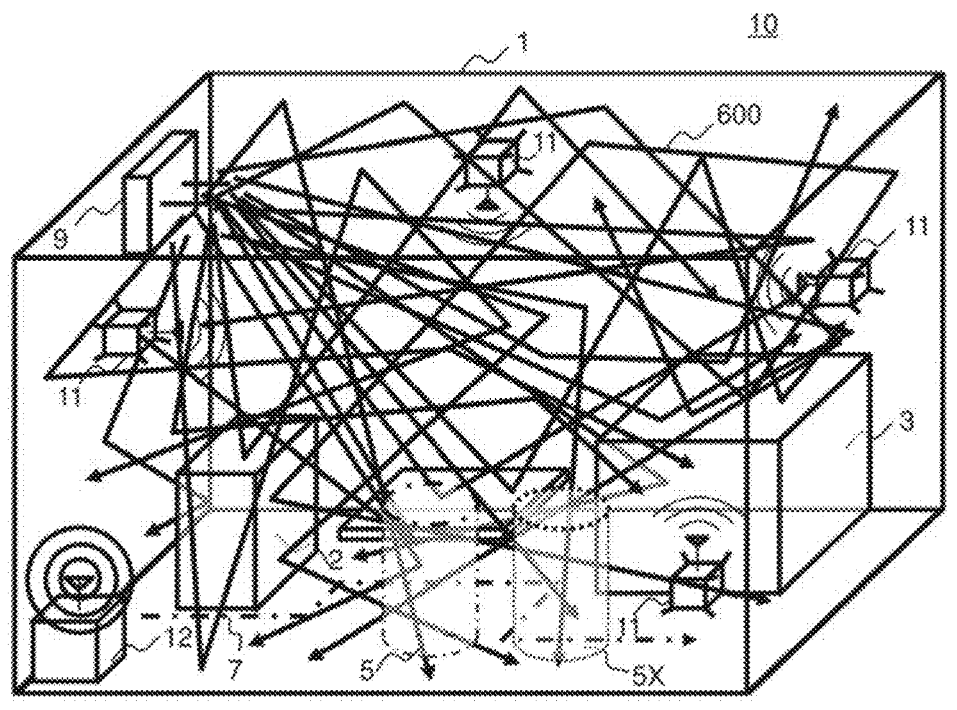
FIG. 6A is a configuration diagram of another exemplary wireless communication environment evaluation system in the real space.

FIG. 6A is a diagram illustrating an operation of hardware placed in the real space 10. In the real space 10, transmitted waves from the access point 9, which serve as a plurality of wave packets 600 generated in a distributed manner, travel straight inside the room 1 and travel to repeatedly undergo the process of reflection by the floor, ceiling, and walls of the room 1, the shelf 2, the table 4, the container 3, and the grounded movable body 5.

The more rays corresponding to the wave packets 600 are reproduced in the virtual space for calculations, the more accurate the simulation becomes, but naturally, the computational load increases. Further, in cases such as when the grounded movable body 5 moves to the position of a grounded movable body 5X, in order to accurately estimate the position by tracking the moving movable body, it is necessary to perform ray tracing calculations at short time intervals, which also results in an increase in computational load.

Figure 6B:
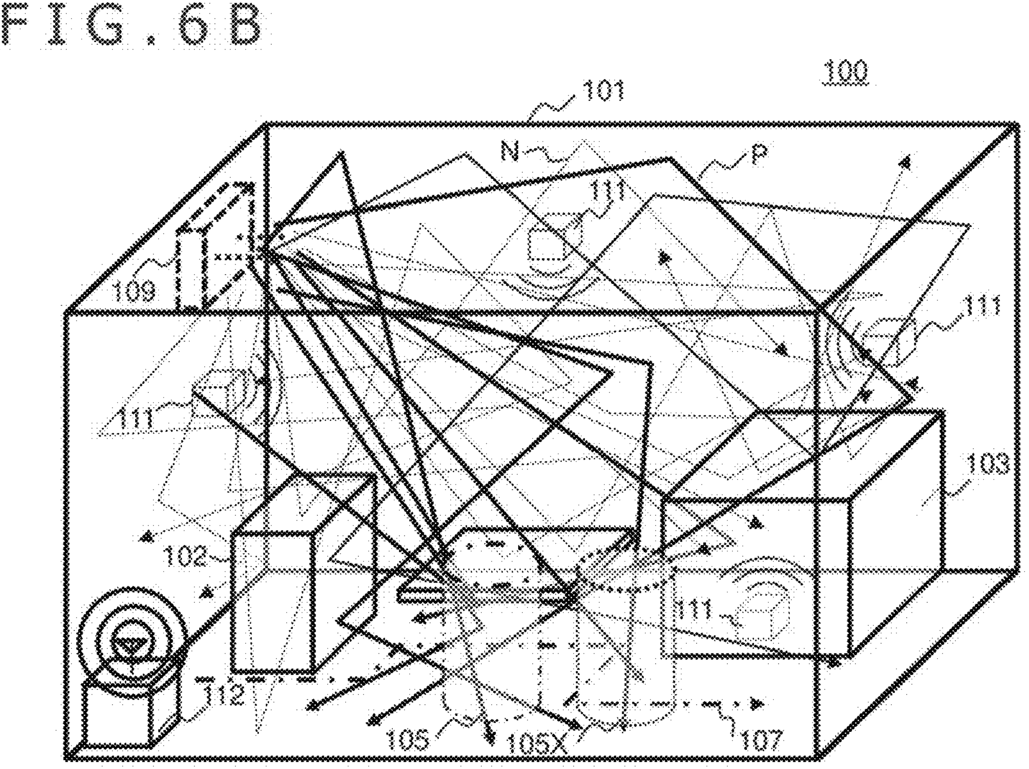
FIG. 6B is a configuration diagram of the other exemplary wireless communication environment evaluation system in the virtual space.

FIG. 6B is a diagram illustrating a method of reducing a computational load by determining, to identify the position of the grounded movable body 5 present in a wireless communication service area, a ray that arrives at the virtual grounded movable body 105 corresponding to the grounded movable body 5 in question and that corresponds to a wave packet in the real space, through ray tracing calculations in the computational resource.

Among rays in the computational resource 100, only the rays reaching the virtual grounded movable body 105 of FIG. 6B are necessary for identifying the position of the grounded movable body 5 of FIG. 6A. With regard to the presence position of the virtual grounded movable body 105, since the time-series presence positions of the corresponding grounded movable body 5 are continuous, the presence position of a virtual grounded movable body 105X, which corresponds to the virtual grounded movable body 105 at the subsequent time, can be determined to be in proximity to the previously estimated position.

In ray tracing calculations performed in the computational resource, rays that correspond to the wave packets of the transmitted waves from the access point 9 in the real space and that are emitted in a distributed manner from the virtual access point 109 are constant regardless of the presence position of the virtual grounded movable body 105 or the virtual grounded movable body 105X. Thus, when micro regions on the virtual grounded movable body 105 in which reflection occurs in a time series manner are identified, in the subsequent time, with use of only the rays reaching the vicinity of the micro region in question, a micro region on the virtual grounded movable body 115 in which reflection occurs at the subsequent time can be determined. For this purpose, for example, it is sufficient to perform calculations only for the rays passing through a predetermined range from the position coordinates of the previously estimated micro region.

Further, at this time, when the virtual path 107 has been able to be estimated, it is sufficient to perform calculations only for the micro regions at the coordinates along the virtual path 107, and further calculations can be omitted.

FIG. 6B is a diagram illustrating a method of identifying micro regions on the virtual grounded movable body on which reflection occurs in a time series manner, with use of, among all the rays generated by the virtual access point 109, only the rays that have the potential to reach the vicinity of the virtual grounded movable body 115. It is sufficient to perform calculations only for the rays represented by bold arrows P, and calculations for the rays represented by thin arrows N can be omitted.

According to the present embodiment, it is possible to significantly reduce the man-hours of electromagnetic field calculations for identifying the presence of a movable body in the computational resource with use of a ray tracing method. Thus, it is possible to significantly reduce the time required for the position identification of the movable body present in the wireless communication service area, and it becomes possible to detect changes in the position of the movable body in the service area in question in real time.

Although the radio waves from the access point 9 are described above, radio waves from the measurement transceivers 11 can similarly be treated.

Embodiment 7

Exemplary configuration and operation of the measurement transceiver 11, which is a component of a wireless communication environment evaluation system configured to accurately predict communication performance in wireless communication environments including movable bodies, are described.

Figure 7:
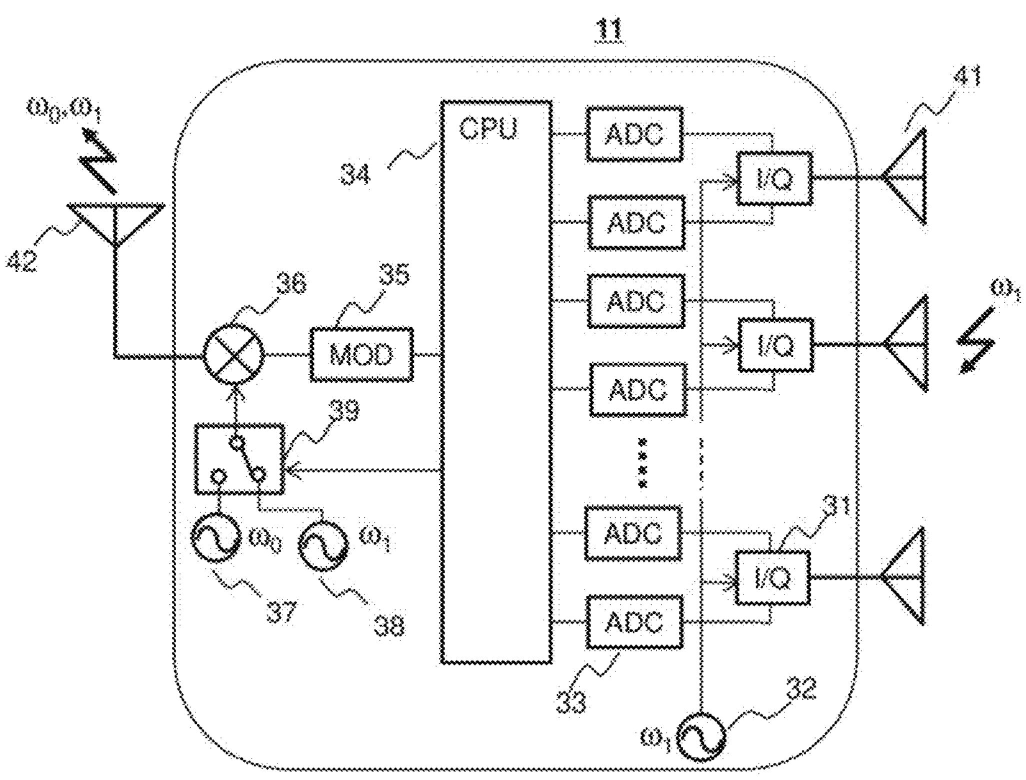
FIG. 7 is a block diagram of an exemplary measurement transceiver.

FIG. 7 is an exemplary circuit diagram of the measurement transceiver 11 used for the wireless communication environment evaluation system configured to accurately predict communication performance in wireless communication environments including movable bodies. The measurement transceiver 11 switches, with a selector switch 39, between sine wave signals to be transmitted to the other measurement transceivers 11 and digital signals to be transmitted to the central wireless station 12. This measurement transceiver 11 is assumed to use a frequency different from a frequency used for wireless communication in a wireless communication service area.

A plurality of receiving antennas 41, which receive sine wave signals from the other measurement transceivers 11, are coupled with respective orthogonal demodulators 31 that are supplied with a local signal $\omega_1$ from a local signal generator 32. In-phase/quadrature-phase (I/Q) outputs of the orthogonal demodulators 31 are input to a central processing unit 34 through respective analog-to-digital converters 33.

A transmitting antenna 42 is coupled with a transmitting mixer 36. Digital signals generated by the central processing unit 34 are input to the transmitting mixer 36 through a modulator 35. The transmitting mixer 36 switches, by the selector switch 39 operated by control signals from the central processing unit 34, between a measurement high-frequency signal generator 38 and a communication high-frequency signal generator 37 to generate local signals. The transmitting mixer 36 up-converts the output signals of the modulator 35 and transmits the resultant to the central wireless station 12 through the transmitting antenna 42.

In measurement, the transmitting mixer 36 transmits, by the selector switch 39 operated by control signals from the central processing unit 34, sine wave signals from the measurement high-frequency signal generator 38 from the transmitting antenna 42.

The central processing unit 34 detects the relative phase difference in the high-frequency signal region of received signals from the plurality of receiving antennas 41 to measure the arrival angles of signals arriving at the measurement transceiver 11. The plurality of receiving antennas 41 are required to have low spatial correlation and desirably placed at distances equal to or greater than half a wavelength of high-frequency signals uniformly used for communication in a three-dimensional direction. The central processing unit 34 transfers the measured arrival angles to the central wireless station 12 via wireless communication by using a communication high-frequency signal $\omega_0$.

Further, in measurement, a measurement high-frequency signal $\omega_1$ is transmitted to generate incoming waves to be received by the other measurement transceivers 11.

According to the present embodiment, it is possible to measure the arrival directions of electromagnetic waves present in the wireless communication area, thereby enabling the implementation of the hardware of the measurement transceiver of the wireless communication environment evaluation system of the embodiment.

Embodiment 8

Exemplary configuration and operation of the central wireless station 12, which is a component of a wireless communication environment evaluation system configured to accurately predict communication performance in wireless communication environments including movable bodies, are described.

Figure 8:
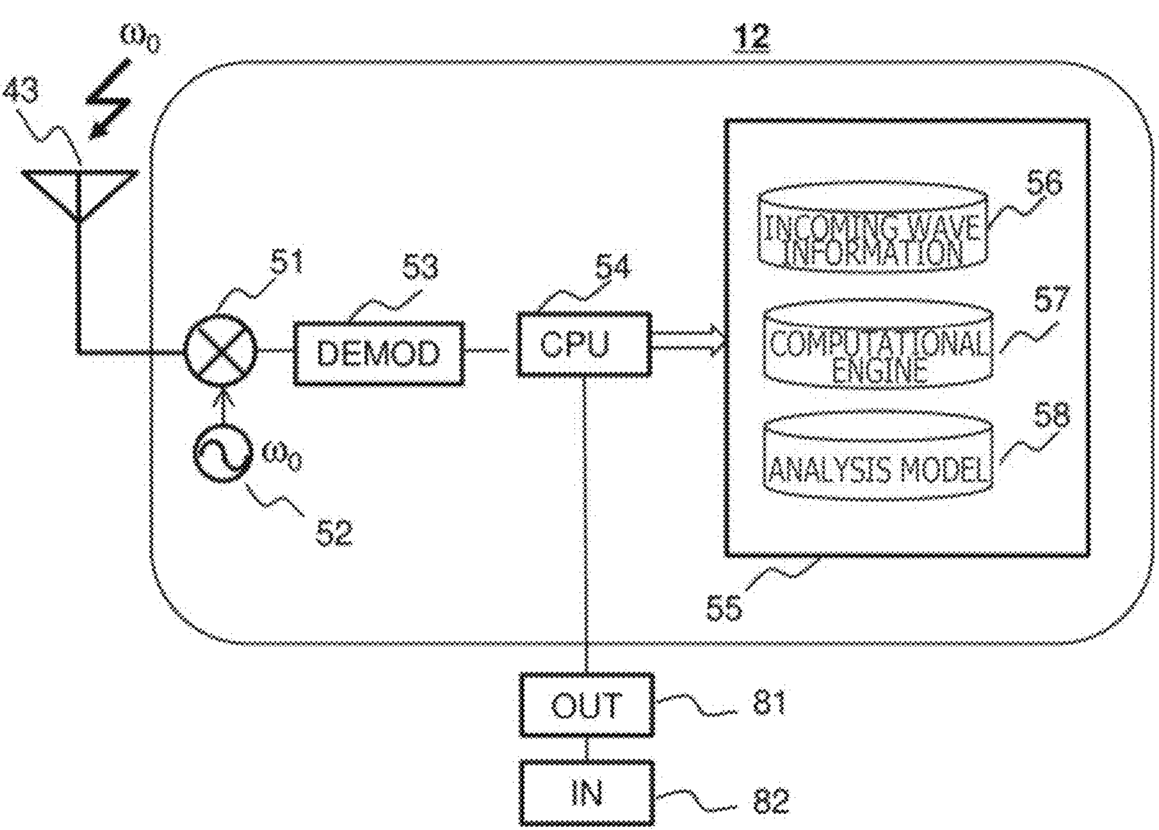
FIG. 8 is a block diagram of an exemplary central wireless station.

FIG. 8 is an exemplary block diagram of the central wireless station 12 used for the wireless communication environment evaluation system configured to accurately predict communication performance in wireless communication environments including movable bodies.

A receiving antenna 43 is coupled with a receiving mixer 51 that is supplied with a local signal $\omega_0$ from a local signal generator 52. An output of the receiving mixer 51 is input to a central processing unit 54 through a demodulator 53.

The central processing unit 54 determines the individual phase differences of a plurality of incoming waves arriving at the measurement transceivers, through numerical calculations using the plurality of received digital signals. The incoming wave information on the measurement transceivers 11 obtained by the central processing unit 54 is transmitted to a computational resource unit 55. The computational resource unit 55 includes an incoming wave information memory module 56, an electromagnetic field computational engine 57, and an electromagnetic field analysis model storage module 58.

The incoming wave information (the arrival direction and the strength) at each point in the real space obtained from the plurality of measurement transceivers 11 reaches the central wireless station 12 via wireless communication, thereby being down-converted and demodulated. The demodulated incoming wave information is stored in the incoming wave information memory module 56 in the computational resource unit 55.

Information on structures which exclude movable bodies, the information being necessary for electromagnetic field calculations in a wireless communication area, is stored in the electromagnetic field analysis model storage module 58 in advance. The computational resource unit 55 performs, using the data in the incoming wave information memory module 56 and the electromagnetic field analysis model storage module 58, the respective electromagnetic field calculations of the embodiments of FIG. 1A to FIG. 6B with the electromagnetic field computational engine 57.

The central wireless station 12 may include an output device 81 and an input device 82 as man-machine interfaces. The central processing unit 54, the output device 81, the input device 82, and the computational resource unit 55 may be formed with use of general computers. As the output device 81 and the input device 82, general configurations can be used. The output device 81 can be a display, and the input device 82 can be a keyboard. The computational resource unit 55 can be implemented with use of software, hardware, or a combination thereof. In the present embodiment, the computational resource unit 55 includes a memory device such as a hard disk or a semiconductor memory.

The incoming wave information memory module 56 is a database including data on reception coordinates, strengths, and directions of incoming waves stored in the memory device.

The electromagnetic field computational engine 57 is software (program) stored in the memory device and executes ray tracing calculations or the like with the central processing unit 54. The electromagnetic field computational engine 57 may also be dedicated hardware, and hence, the subject of electromagnetic field calculations may be the electromagnetic field computational engine 57.

The electromagnetic field analysis model storage module 58 is a computational model (environment reproduction model) stored in the memory device. The electromagnetic field analysis model storage module 58 is created by the electromagnetic field computational engine 57 or separately created and stored in the memory device. The environment reproduction model is read and used by the electromagnetic field computational engine 57 when the electromagnetic field computational engine 57 performs electromagnetic field calculations. Further, the electromagnetic field computational engine 57 makes computational model changes to reflect information on movable bodies in the real space.

According to the present embodiment, it is possible to measure the arrival directions of electromagnetic waves present in the wireless communication area, thereby enabling the implementation of the hardware of the central wireless station of the wireless communication environment evaluation system of the embodiment.

In the system of the embodiment, for example, the plurality of measurement transceivers 11 of Embodiment 7 and the single central wireless station 12 of Embodiment 8 are prepared. Then, measurement sine waves are simultaneously transmitted from the plurality of measurement transceivers 11 and simultaneously received by the plurality of measurement transceivers 11.

As a geometric configuration of the measurement transceiver 11, for example, the measurement transceiver 11 includes the transmitting antenna 42 on one surface of a cube and the receiving antennas 41 for measuring incoming waves at the eight vertices of the cube. The receiving antennas 41 satisfy the condition of low spatial correlation described above.

The measurement transceiver 11 simultaneously receives a plurality of signals in different phases obtained by the plurality of receiving antennas 41, at different positions in a space. Then, the signals are compared with signals in the same phase generated by the local signal generator 32 of the measurement transceiver 11. Specifically, the phase difference is detected from the amplitude change of the multiplied signal of the incoming wave signal and the signal from the oscillator (the maximum amplitude corresponds to the same phase, and a zero amplitude corresponds to a 90° phase). With this, the phase difference of each incoming wave is detected.

A plurality of signals (sine waves) in different phases but the same frequency that simultaneously arrive at a plurality of different positions form a three-dimensional strength distribution of received signals, which is called a "directional pattern," in a space. Since the above-described distribution is unique to the phase deviation of the plurality of incoming waves, the directions of the plurality of radio waves simultaneously arriving can be identified from the directional pattern in question. Incidentally, the technology that applies this principle to transmission is known as beamforming antennas.

The directional pattern has a spatial distribution with protruding parts of the maximum amplitude and null parts of the minimum amplitude in a polar coordinate system and has a shape resembling an amoeba, for example. The maximum parts match the arrival directions of an electric field. A plurality of transmitted waves are mixed and received by the measurement transceiver 11, but, with regard to the transmitted waves, rays corresponding to the incoming waves in the real space can be identified with the above-mentioned technology.

However, instead of simultaneously transmitting measurement sine waves from the plurality of measurement transceivers 11 as described above, measurement sine waves may be sequentially transmitted from each of the measurement transceivers 11 to perform a measurement. Although more measurement time is required, the receiver configuration and calculations are simplified as each ray that is a tracking target is independent.

Embodiment 9

Other exemplary configuration and operation of the measurement transceiver 11, which is a component of a wireless communication environment evaluation system configured to accurately predict communication performance in wireless communication environments including movable bodies, are described. A measurement transceiver of the present embodiment receives radio waves transmitted from the access point 9 and utilizes the radio waves for measurement.

Figure 9:
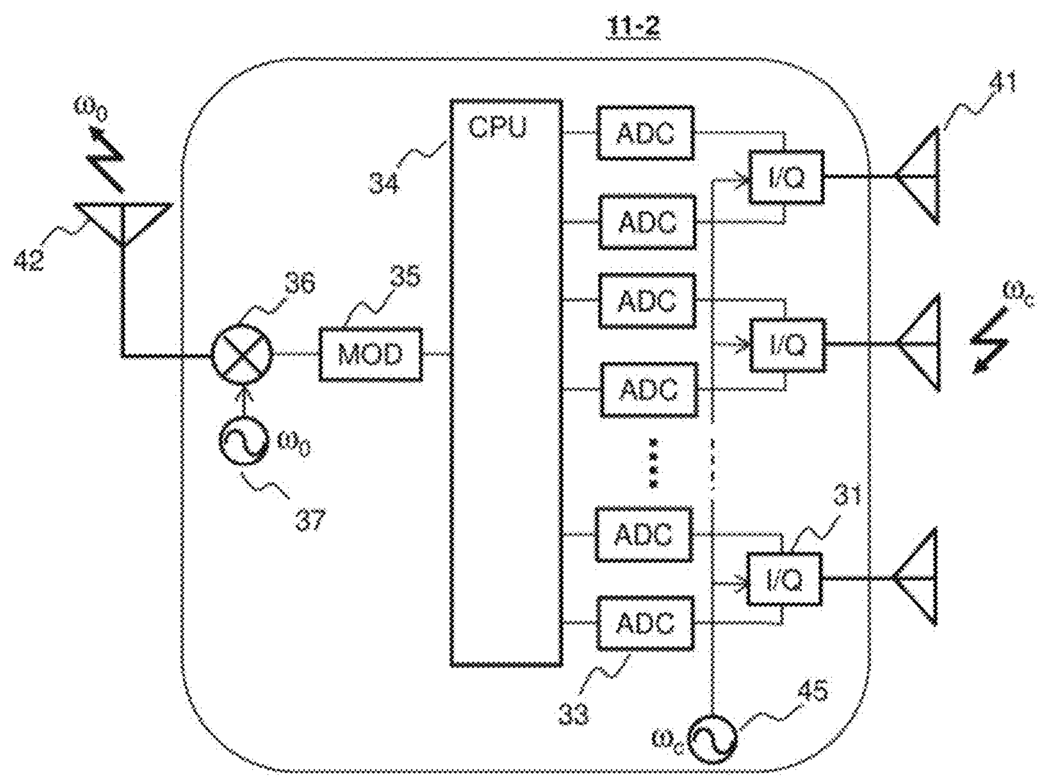
FIG. 9 is a block diagram of another exemplary measurement transceiver.

FIG. 9 is another exemplary circuit diagram of a measurement transceiver 11-2 that is suitably used for Embodiment 5 and used for the wireless communication environment evaluation system configured to accurately predict communication performance in wireless communication environments including movable bodies.

The plurality of receiving antennas 41 are coupled with the orthogonal demodulators 31 that are supplied with a local signal $\omega_c$ from a carrier wave signal generator 45. The I/Q outputs of the orthogonal demodulators 31 are input to the central processing unit 34 through the respective analog-to-digital converters 33. The transmitting antenna 42 is coupled with the transmitting mixer 36. Digital signals generated by the central processing unit 34 are input to the transmitting mixer 36 through the modulator 35. The transmitting mixer 36 up-converts the output signals of the modulator 35 with the local signal $\omega_0$ from the communication high-frequency signal generator 37 and transmits the resultant to the central wireless station 12 through the transmitting antenna 42.

The present embodiment is different from the embodiment of FIG. 7 in that signals received by the measurement transceiver 11-2 at the receiving antennas 41 serve as communication radio waves to be transmitted from the access point 9.

According to the present embodiment, it is no longer necessary for the measurement transceiver to generate the measurement high-frequency signal $\omega_1$, and hence, the hardware configuration of the measurement transceiver is simplified, resulting in effects of reductions in the cost, size, and weight of the measurement transceiver.

Embodiment 10

Other exemplary configuration and operation of the central wireless station 12, which is a component of a wireless communication environment evaluation system configured to accurately predict communication performance in wireless communication environments including movable bodies, are described.

Figure 10:
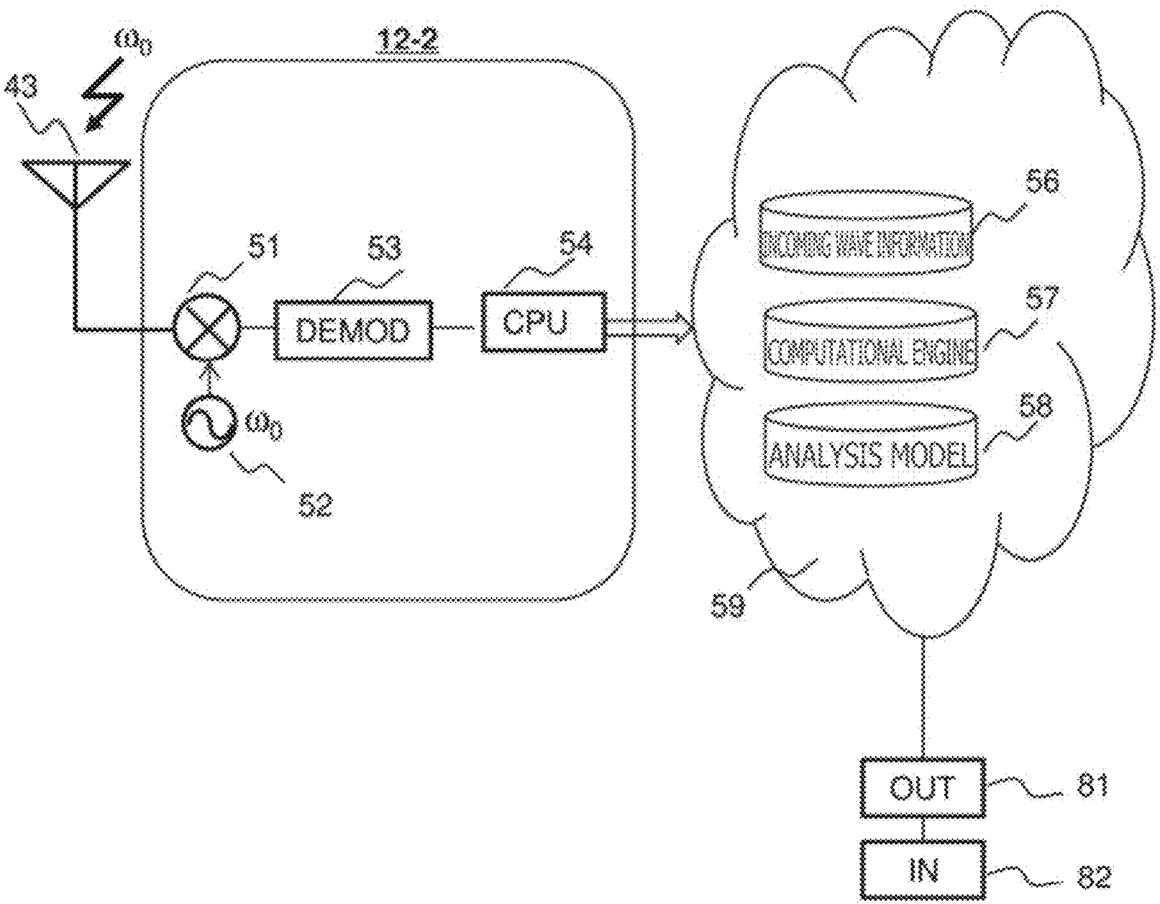
FIG. 10 is a block diagram of another exemplary central wireless station.

FIG. 10 is an exemplary circuit diagram of a central wireless station 12-2 used for the wireless communication environment evaluation system configured to accurately predict communication performance in wireless communication environments including movable bodies. The central wireless station 12-2 is different from the central wireless station 12 of the embodiment of FIG. 8 in that, in place of the computational resource unit 55, the incoming wave information memory module 56, the electromagnetic field computational engine 57, and the electromagnetic field analysis model storage module 58 are placed in a computational resource cloud 59.

According to the present embodiment, it becomes possible to platformize, with use of an Internet environment, the wireless communication environment evaluation system configured to accurately predict communication performance in wireless communication environments including movable bodies. There are effects of generalization of the wireless communication environment evaluation system and reductions in the size, weight, and cost of the hardware for forming the system in question.

Embodiment 11

An exemplary operation flow of a wireless communication environment evaluation system configured to accurately predict communication performance in wireless communication environments including movable bodies is described.

Figure 11:
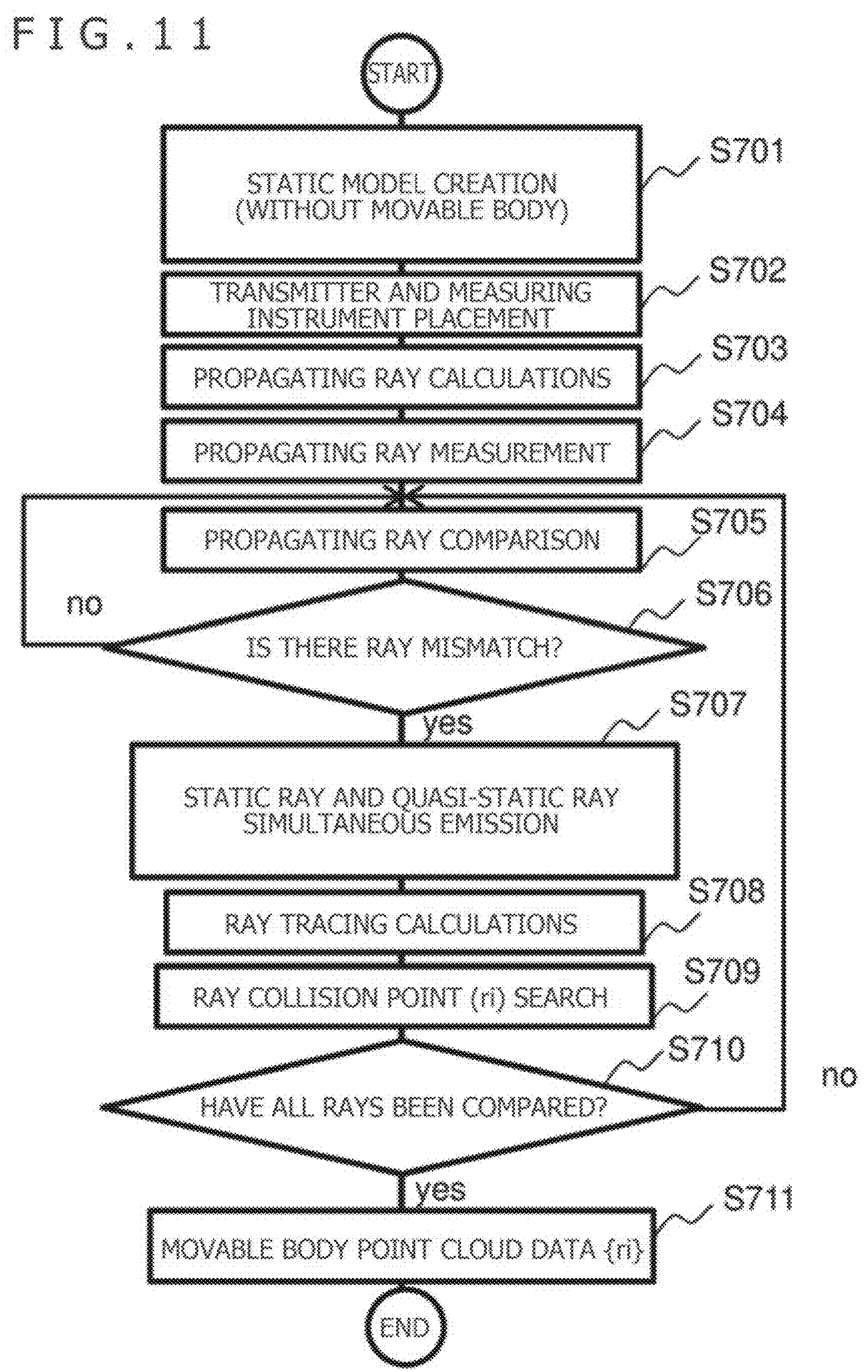
FIG. 11 is a flowchart illustrating exemplary operations of a wireless communication environment evaluation system.

FIG. 11 corresponds to Embodiment 2 and is a diagram illustrating the operation flow of the wireless communication environment evaluation system configured to accurately predict communication performance in wireless communication environments including movable bodies.

First, the structures in the wireless communication service area excluding the movable bodies (the grounded movable body 5 and the floating movable body 6) are converted into structural data compatible with electromagnetic field calculations, thereby creating a static model for calculating the electric field in a communication environment including no movable body, in the computational resource 100 (S701).

Next, the virtual measurement transceivers corresponding to the plurality of measurement transceivers deployed in the real space are placed in the static model in question (S702). The thus created static model is stored in the electromagnetic field analysis model storage module 58. The static model may be created by the electromagnetic field computational engine 57 or separately created by another information processing device.

Subsequently, the electromagnetic field computational engine 57 obtains, by using the static model stored in the electromagnetic field analysis model storage module 58 and the placement information on the virtual measurement transceivers 111, rays corresponding to wave packets propagating in the wireless communication area, through calculations in the computational resource (S703). Note that the creation of static models and ray tracing calculations may basically utilize well-known technologies.

Subsequently, the measurement transceivers 11 (or the access point 9) deployed in the real space transmit measurement signals, and the plurality of measurement transceivers 11 deployed in the real space measure the arrival directions of the received waves to obtain the information on the incoming waves (S704). The incoming wave information indicates, for example, the arrival direction of one or a plurality of incoming waves received by each of the measurement transceivers 11. The incoming wave information is output from the central processing unit 34 as digital signals together with, for example, the identification information and position information on the measurement transceivers that have received the incoming waves and the measurement times. The incoming wave information is modulated to be transmitted from the measurement transceivers 11 to the central wireless station 12, as described with FIG. 7 and the like. In the central wireless station 12, the information in question is demodulated to be stored in the incoming wave information memory module 56.

The electromagnetic field computational engine 57 compares the incoming wave directions obtained from the information on the measured incoming waves stored in the incoming wave information memory module 56 with the arrival directions of rays calculated by the electromagnetic field computational engine 57 and formed in the computational resource (S705).

The electromagnetic field computational engine 57 determines, with regard to each ray in the computational resource, whether the arrival directions match or not (S706). In a case where a mismatch is detected (yes in S706), a ray is generated from the transmitted wave generation point (the virtual measurement transceiver 111 or the virtual access point 109) in the computational resource. Simultaneously, the virtual measurement transceiver 111 which corresponds to the measurement transceiver 11 that has measured the incoming wave in the direction that does not match the ray in the computational resource generates a ray in the arrival direction measured by the measurement transceiver 11 (S707).

The travel of each ray is sequentially obtained through ray tracing calculations (S708), and the point at which the incoming wave directions collide with each other is searched for (709).

The processing described above is described with use of the ray between the measurement transceivers 11*b* and 11*d* of FIG. 1C and FIG. 1D. To simplify the description, it is assumed that measurement signals are generated only from the measurement transceiver 11*b*. Since the directions and strengths of radio waves transmitted from the measurement transceiver 11*b* are already known, a ray A that travels from a virtual measurement transceiver 111*b* to the virtual measurement transceiver 111*d* can be generated in the corresponding computational resource. Thus, the arrival direction of the radio wave measured by the virtual measurement transceiver 111*d* is determined from the ray A (see FIG. 1D).

Meanwhile, in the measurement transceiver 11*d* in the real space 10, the arrival direction of the measured radio wave is determined by an arrow K (see FIG. 1C). This arrival direction does not match the ray A in the computational resource 100. A ray B that travels from the virtual measurement transceiver 111*d* corresponding to the measurement transceiver 11*d* in the arrival direction of the radio wave in the real space is generated (see FIG. 1D). The cause of the discrepancy between the rays in the real space and the virtual space lies in the position at which the ray B collides with the ray A in the computational resource. The micro region 119 is set at the above-described position, assuming that the floating movable body 6 is present at the position (see FIG. 1D).

Further, when the above-mentioned processing is performed in a time series manner to track a moving movable body, by limiting the search range of micro regions to the movement range of the movable body estimated from the speed of the movable body, it is possible to efficiently track the moving movable body. For this purpose, the calculation target is limited to the ray A that passes through the above-mentioned movement range, thereby enabling efficient tracking of the moving movable body.

The processing from S705 to S709 is repeatedly executed for all the rays (S710). After the processing has been completed for all the rays (yes in S710), the collision point data is accumulated to obtain point cloud data as a set of micro regions which is present on the movable body and in which reflection of radio waves occurs (S711).

From the obtained point cloud data, data on the virtual floating movable body 106 and the virtual grounded movable body 105 can be obtained. The electromagnetic field computational engine 57 can modify the environment reproduction model (static model) in the electromagnetic field analysis model storage module 58 by using this data, thereby obtaining an environment reproduction model including the movable body. Further, by repeating this processing in a time series manner to dynamically change the environment reproduction model, it is possible to obtain a dynamic environment reproduction model (dynamic model).

According to the present embodiment, there is an effect of generating, in the computational resource, a point cloud for identifying the position and shape of the movable body present in the wireless communication service area.

Embodiment 12

Another exemplary operation flow of a wireless communication environment evaluation system configured to accurately predict communication performance in wireless communication environments including movable bodies is described.

Figure 12:
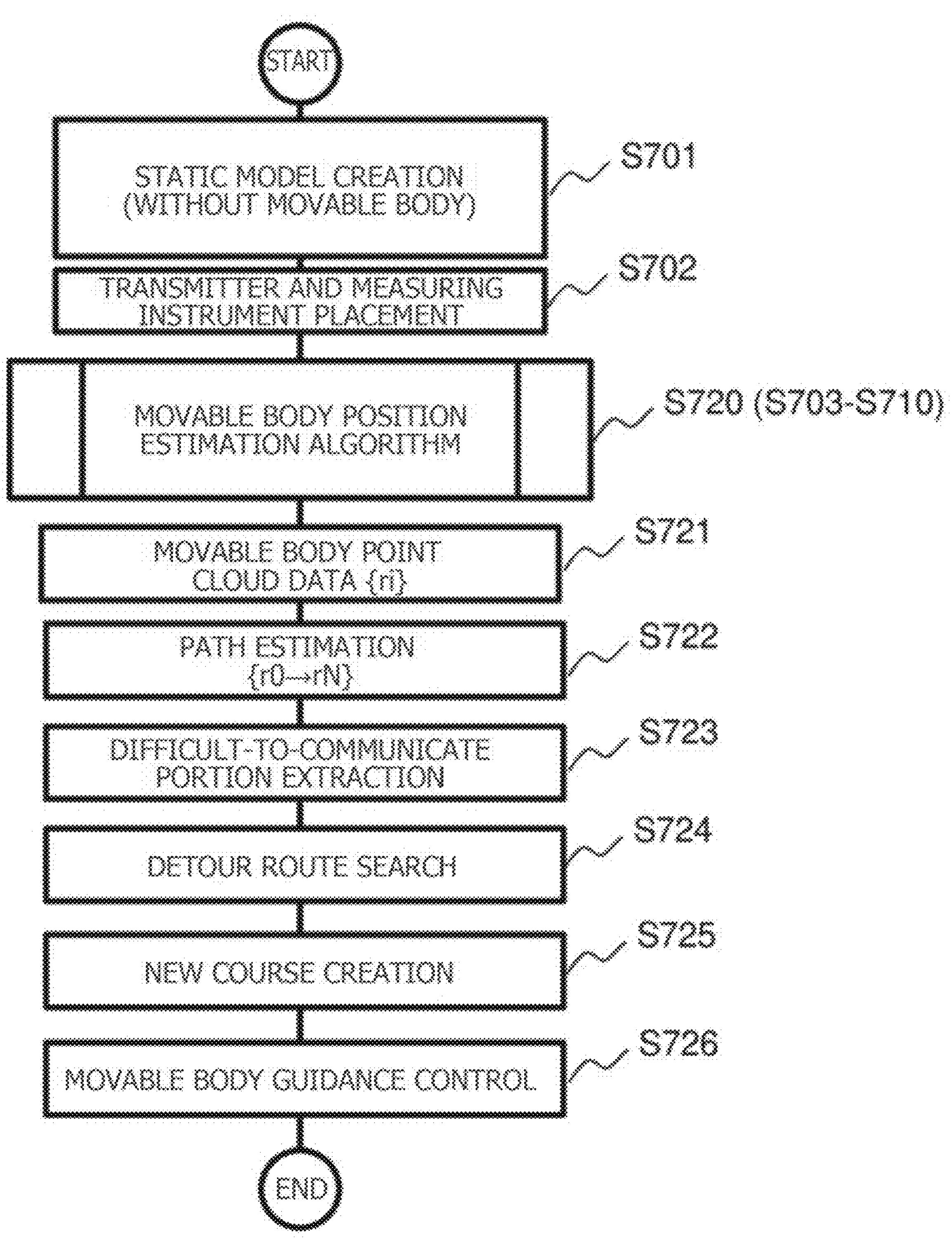
FIG. 12 is a flowchart illustrating other exemplary operations of a wireless communication environment evaluation system.

FIG. 12 corresponds to Embodiment 4 and is a diagram illustrating the other operation flow of the wireless communication environment evaluation system configured to accurately predict communication performance in wireless communication environments including movable bodies.

As in Embodiment 11, first, the structures in the wireless communication service area including no movable body are converted into structural data compatible with electromagnetic field calculations, thereby creating a static model for calculating the electric field in a communication environment including no movable body, in the computational resource (S701). Next, the virtual measurement transceivers 111 corresponding to the plurality of measurement transceivers 11 deployed in the real space are placed in the static model in question (S702).

Subsequently, the electromagnetic field computational engine 57 obtains point cloud data for identifying the position and shape of the movable body (S721) by a procedure (S720) similar to the embodiment of FIG. 11 (S703 to S710).

The course on which the movable body is present is estimated from the point cloud data obtained by repeating the above-described operations in a time series manner (S722).

A ray is emitted from the transmitted wave generation point set in the computational resource, for example, from the virtual access point 109, and whether the ray in question reaches the obtained course or not is determined. Then, portions on the course where the ray cannot reach and wireless communication is difficult are extracted (S723).

Regions where the ray can reach and communication is possible in the vicinity of the extracted difficult-to-communicate portions are searched for through ray tracing calculations (S724).

A new course (the virtual detour air route 120) that bypasses the difficult-to-communicate regions is determined through ray tracing calculations with use of the discovered communicable regions (S725).

Communication with the movable body in the wireless communication service area is established with high stability and reliability with use of the newly obtained communicable path (S726). For example, it becomes possible to execute the control of a robot that is a movable body, without interruption.

According to the present embodiment, there is an effect of implementing highly reliable and stable communication with the movable body present in the wireless communication service area.

Embodiment 13

An exemplary man-machine interface of a wireless communication environment evaluation system configured to accurately predict communication performance in wireless communication environments including movable bodies is described.

Figure 13:
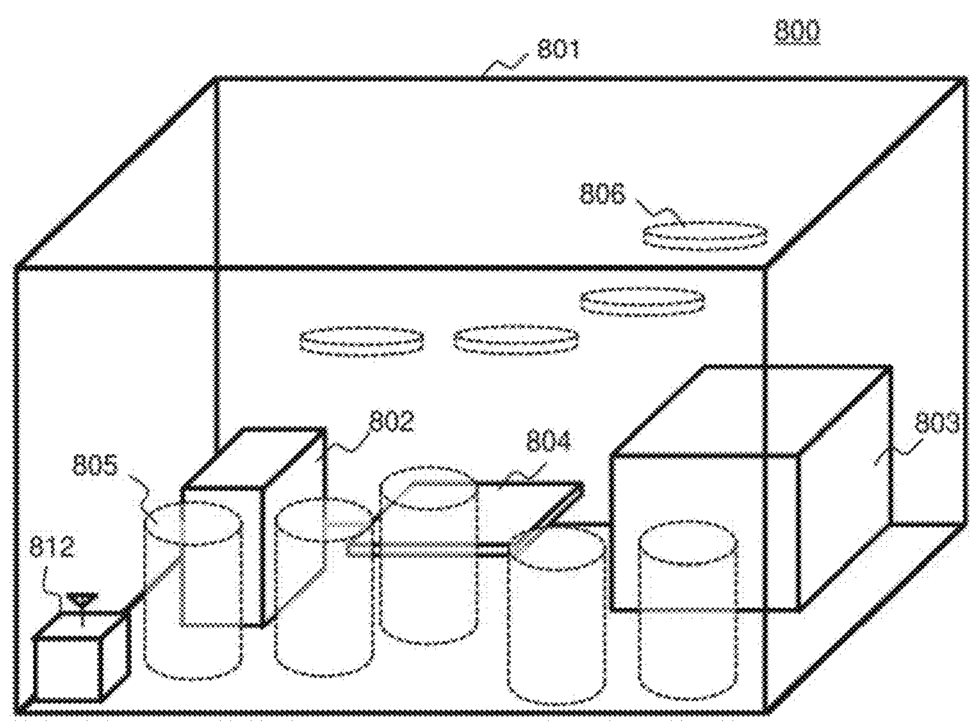
FIG. 13 is a conceptual diagram illustrating an exemplary man-machine interface display of a wireless communication environment evaluation system.

FIG. 13 is a diagram illustrating the man-machine interface of the wireless communication environment evaluation system configured to accurately predict communication performance in wireless communication environments including movable bodies and illustrates elements displayed on the output device 81 such as a display.

A man-machine interface 800 of the wireless communication environment evaluation system suitably applied to Embodiment 2 simultaneously displays objects corresponding to static structures, which are not movable bodies, used for identifying the position of a movable body present in a wireless communication service area, such as a virtual room 801, a virtual shelf 802, a virtual table 804, a virtual container 803, and a virtual floating movable body group 806 and a virtual grounded movable body group 805 generated in the virtual room 101 and the computational resource, as well as a central wireless station 812 if necessary.

According to the present embodiment, the relative positional relation between the movable bodies present in the wireless communication area and the structures present in the area in question is clarified, and hence, there is an effect of facilitating wireless engineering that is used for constructing highly stable and reliable wireless networks and that includes the installation of access points.

Embodiment 14

Another exemplary man-machine interface of a wireless communication environment evaluation system configured to accurately predict communication performance in wireless communication environments including movable bodies is described.

Figure 14:
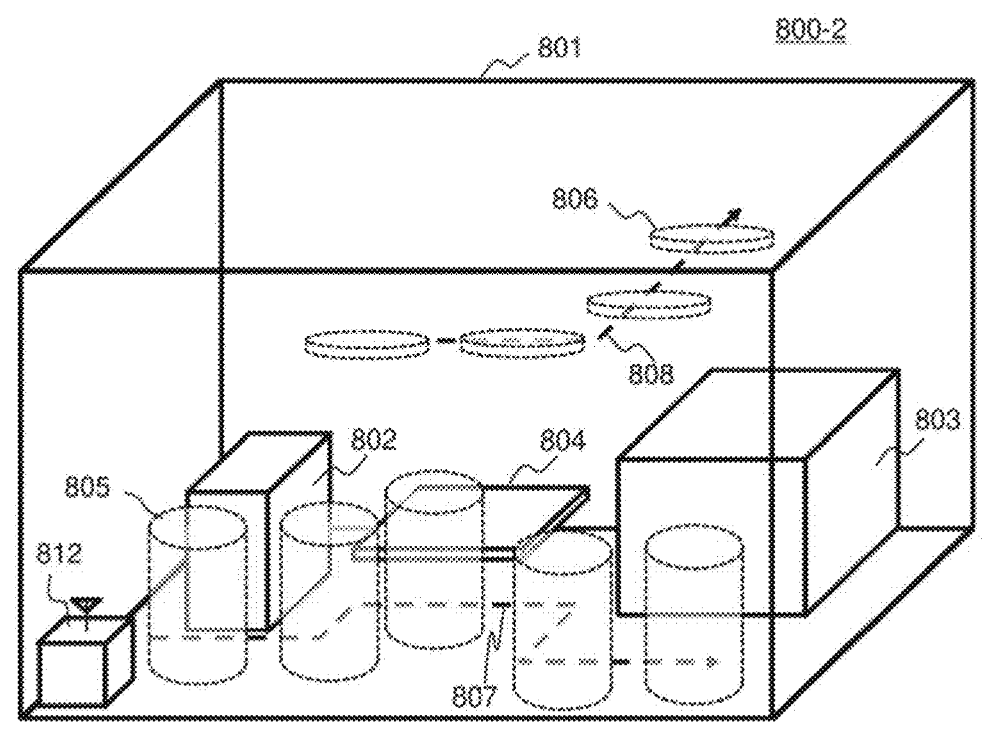
FIG. 14 is a conceptual diagram illustrating another exemplary man-machine interface display of a wireless communication environment evaluation system.

FIG. 14 is a diagram illustrating the other man-machine interface of the wireless communication environment evaluation system configured to accurately predict communication performance in wireless communication environments including movable bodies and illustrates elements displayed on the output device 81 such as a display.

A man-machine interface 800-2 of the wireless communication environment evaluation system suitably applied to Embodiment 3 and the like displays, in addition to the elements of Embodiment 13, by using time-series presence information on each movable body included in the virtual floating movable body group 806 or the virtual grounded movable body group 805, an air route 808 and a path 807 on which the virtual floating movable body and the virtual grounded movable body are present.

According to the present embodiment, the relative positional relation between the movable bodies present in the wireless communication area and the structures present in the area in question is clarified in a time series manner, and hence, there is an effect of facilitating wireless engineering that is used for dynamically constructing highly stable and reliable wireless networks and that includes the installation of access points.

Embodiment 15

Another exemplary man-machine interface of a wireless communication environment evaluation system configured to accurately predict communication performance in wireless communication environments including movable bodies is described.

Figure 15:
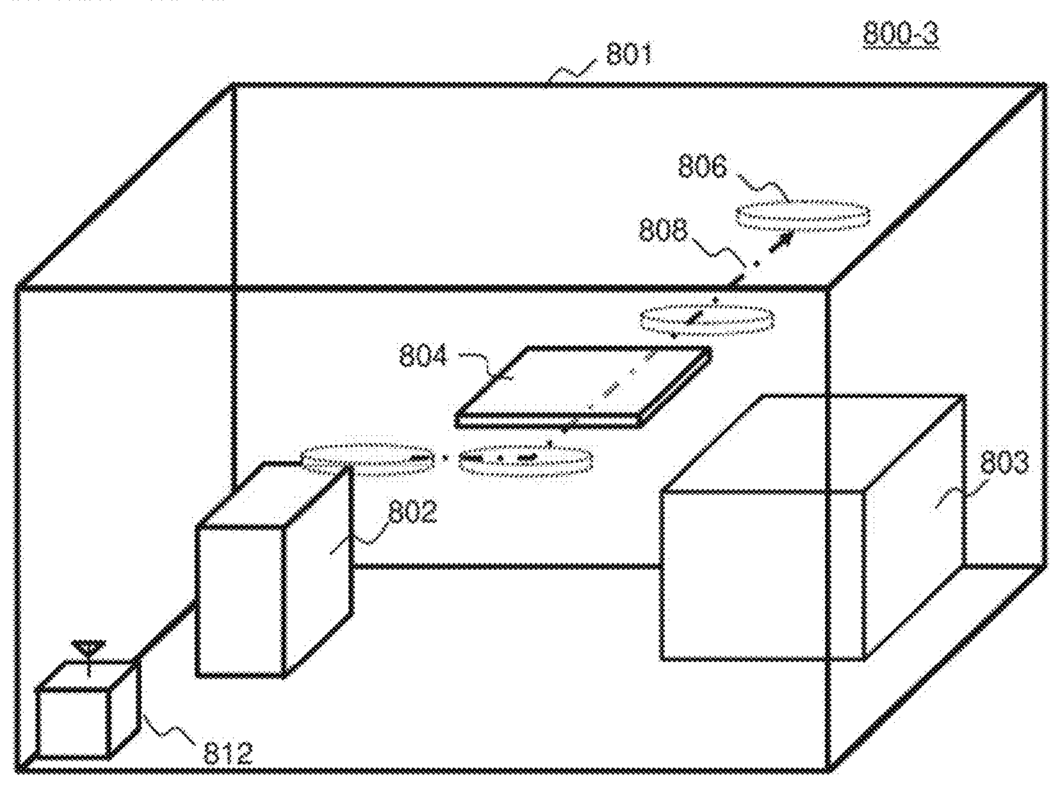
FIG. 15 is a conceptual diagram illustrating another exemplary man-machine interface display of a wireless communication environment evaluation system.

FIG. 15 is a diagram illustrating the other man-machine interface of the wireless communication environment evaluation system configured to accurately predict communication performance in wireless communication environments including movable bodies and illustrates elements displayed on the output device 81 such as a display.

A man-machine interface 800-3 of the wireless communication environment evaluation system suitably applied to Embodiment 3 and the like simultaneously displays the virtual room 801, the virtual shelf 802, the virtual table 804, the virtual container 803, and the virtual floating movable body group 806 generated in the virtual room 101 and the computational resource that correspond to static structures, which are not movable bodies, used for identifying the position of a movable body present in a wireless communication service area.

Moreover, with use of time-series presence information on the movable bodies included in the virtual floating movable body group 806 and, if necessary, interpolation or extrapolation of the presence position of the movable body at each time, the air route 808 on which the virtual floating movable body is present is estimated and displayed. The same can also be applied to the virtual grounded movable body group 805.

According to the present embodiment, the relative positional relation between the movable body present in the wireless communication area and the structures present in the area in question is clarified in a time series manner, and hence, there is an effect of facilitating wireless engineering that is used for dynamically constructing highly reliable wireless networks and that includes the installation of access points.

Embodiment 16

Another exemplary man-machine interface of a wireless communication environment evaluation system configured to accurately predict communication performance in wireless communication environments including movable bodies is described.

Figure 16:
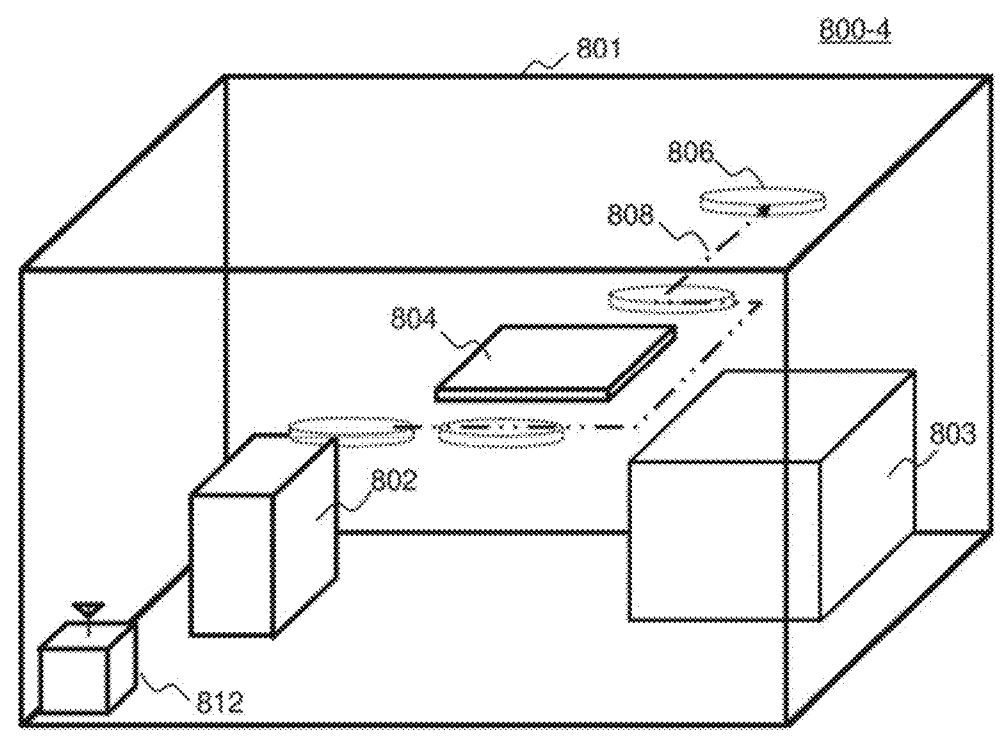
FIG. 16 is a conceptual diagram illustrating another exemplary man-machine interface display of a wireless communication environment evaluation system.

FIG. 16 is a diagram illustrating the other man-machine interface of the wireless communication environment evaluation system suitably applied to Embodiment 4 and illustrates elements displayed on the output device 81 such as a display.

A man-machine interface 800-4 simultaneously displays the virtual room 101, the virtual shelf 102, the virtual table 104, the virtual container 103, and the virtual floating movable body group 806 generated in the virtual room 101 and the computational resource that correspond to static structures, which are not movable bodies, used for identifying the position of a movable body present in a wireless communication service area.

Moreover, with use of time-series presence information on the movable bodies included in the virtual floating movable body group 806 and information on regions where rays emitted from the transmission point of the virtual access point 109 installed in the computational resource reach, the air route 808 and the virtual floating movable body group 806 that indicates a presence position of the floating movable body that allows wireless communication with the virtual access point 109 are estimated and displayed. The same can also be applied to the virtual grounded movable body group 805.

According to the present embodiment, the relative positional relation between the movable body present in the wireless communication area and the structures present in the area in question is clarified in a time series manner. Thus, there is an effect of facilitating wireless engineering that is used for dynamically constructing highly reliable and stable wireless networks without interruptions in wireless communication and that includes the installation of access points.

Note that, although the floating movable body 6 is the main communication target in the above-mentioned embodiment, it goes without saying that the same can also be applied to the grounded movable body 5 and other movable bodies.

According to the above-mentioned embodiment, the estimation of communication quality in the service area providing wireless communication can be added to the electromagnetic field computational model for the fixed structures constructed in the computational resource, and the estimated structures of the movable bodies and the identified positions of the movable bodies obtained with use of the measurement values of the arrival directions of electromagnetic waves in the real space can be added to the computational resource. Thus, it becomes possible to accurately predict communication performance through electromagnetic field calculations by reflecting the effects of all the electromagnetic wave scatterers, which include the movable bodies and affect the wireless communication performance in the service area. Thus, it is possible to determine the placement of the transceivers for implementing highly stable and reliable wireless communication in wireless communication environments including movable bodies, and there is an effect of optimizing the communication performance of the wireless system.

Further, since radio wave environments can accurately be simulated in the computational resource, the need for operations in the real space can be reduced, resulting in lower energy consumption and reduced carbon emissions. This contributes to the prevention of global warming and the realization of sustainable society.

What is claimed is:

1. A wireless communication environment evaluation method comprising:

using an information processing device that includes a central processing unit, an output device, an input device, and a memory device and that is configured to provide a computational resource, wherein the information processing device is configured to:

construct a structural model of an electromagnetic wave scatterer in the computational resource, calculate a characteristic of an electromagnetic field by using the structural model and a ray that simulates a radio wave traveling in a real space that is not virtual, and obtain, on a basis of a result of the calculation using a first structural model corresponding to the real space including a first object and excluding a second object and electromagnetic wave vector measurement data on the real space including the first object and the second object, position information on a position of the second object, wherein the first structural model is changed on a basis of the position information to generate a second structural model including the first object and the second object, wherein the electromagnetic wave vector measurement data includes a result of receiving, at a second position, a transmitted electromagnetic wave transmitted from a first position in a predetermined direction in the real space including the first object and the second object, and the wireless communication environment evaluation method executes:

a first step of generating, with use of the first structural model, a first ray that simulates the transmitted electromagnetic wave transmitted from the first position in the predetermined direction to travel to the second position, a second step of generating, with use of the first structural model, a second ray from the electromagnetic wave vector measurement data, and a third step of generating the second structural model by obtaining the position information on a basis of the first ray and the second ray, generating, on a basis of the position information, a structural model of an electromagnetic wave scatterer corresponding to at least part of the second object, as an additional structural model, and adding the additional structural model to the computational resource.

2. The wireless communication environment evaluation method according to claim 1, wherein the additional structural model has, as a component, a region defined at a position at which the first ray collides with the second ray.

3. The wireless communication environment evaluation method according to claim 2, wherein a plurality of the regions are connected to each other to estimate a shape of the second object.

4. The wireless communication environment evaluation method according to claim 1, wherein the first object is an immovable body configured to be prevented from changing its position over time, and the second object is a movable body configured to change its position over time.

5. The wireless communication environment evaluation method according to claim 4, wherein the electromagnetic wave vector measurement data is collected at a plurality of times, a plurality of the additional structural models are generated correspondingly to the plurality of times in the first step to the third step, and the wireless communication environment evaluation method further executes a fourth step of estimating a course of the movable body on a basis of the plurality of the additional structural models.

6. The wireless communication environment evaluation method according to claim 5, wherein the characteristic of the electromagnetic field is calculated with use of the second structural model and a ray that simulates a radio wave traveling from an access point located in the real space, and at least one of changing a position of the access point and changing the course is performed such that the radio wave from the access point reaches the whole course of the movable body.

7. The wireless communication environment evaluation method according to claim 5, wherein, when the electromagnetic wave vector measurement data is collected at a first time and a second time, in the first step corresponding to the second time, only a ray that passes through a predetermined range from a position of a first additional structural model generated correspondingly to the first time is regarded as the first ray.

8. A wireless communication environment evaluation system comprising:

an incoming wave information memory module configured to store measurement data on an arrival direction of a received wave in a wireless communication service area;

an electromagnetic field analysis model storage module configured to store a structural model of an electromagnetic wave scatterer; and an electromagnetic field computational engine configured to perform an electromagnetic field calculation, wherein the electromagnetic field computational engine estimates, by using the measurement data and the structural model, a position of a movable body in the wireless communication service area through the electromagnetic field calculation, wherein the measurement data includes an arrival direction of a radio wave obtained by receiving, by one or a plurality of receivers in the wireless communication service area, a radio wave transmitted from one or a plurality of transmitters present in the wireless communication service area, wherein the structural model is a structural model based on data on a structure that is present in the wireless communication service area and that excludes the movable body, wherein the measurement data is compared with a travel trajectory of a radio wave calculated with use of the structural model based on the data on the structure excluding the movable body, and a position of the movable body is estimated with use of an arrival direction of a received wave with regard to which the measurement data mismatches the travel trajectory and the travel trajectory of the radio wave.

9. The wireless communication environment evaluation system according to claim 8, wherein the transmitter uses a radio wave at a frequency different from a frequency used for wireless communication in the wireless communication service area.

10. The wireless communication environment evaluation system according to claim 8, wherein the transmitter uses a radio wave at a same frequency as a frequency used for wireless communication in the wireless communication service area.

* * * * *